US010635276B2

(12) United States Patent
Sun et al.

(10) Patent No.: US 10,635,276 B2
(45) Date of Patent: *Apr. 28, 2020

(54) COHORT-BASED PRESENTATION OF USER INTERACTION DATA

(71) Applicant: Palantir Technologies Inc., Palo Alto, CA (US)

(72) Inventors: Zennard Sun, Mountain View, CA (US); Rafee Memon, Menlo Park, CA (US); Diran Li, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/813,841

(22) Filed: Nov. 15, 2017

(65) Prior Publication Data

US 2018/0074684 A1 Mar. 15, 2018

Related U.S. Application Data

(63) Continuation of application No. 14/323,904, filed on Jul. 3, 2014, now Pat. No. 9,864,493, which is a
(Continued)

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 16/248* (2019.01); *G06F 16/2465* (2019.01);
(Continued)

(58) Field of Classification Search
CPC .... G06F 16/2465; G06F 16/248; G06F 16/26; G06F 16/435; G06F 3/04842
See application file for complete search history.

(56) References Cited

U.S. PATENT DOCUMENTS 5,109,399 A   4/1992  Thompson
5,329,108 A   7/1994  Lamoure
(Continued)

FOREIGN PATENT DOCUMENTS

CN   102054015    5/2014
DE   102014103482  9/2014
(Continued)

OTHER PUBLICATIONS

Official Communication for Australian Patent Application No. 2014240326 dated Feb. 28, 2018.
(Continued)

*Primary Examiner* — Linh K Pham
(74) *Attorney, Agent, or Firm* — Knobbe Martens Olson & Bear LLP

(57) ABSTRACT

An interactive, customizable, user interaction data analysis system is disclosed. The system may be configured to provide cohort-based analysis and/or graphical visualizations of user interaction data to a system operator. User interaction data may be obtained, for example, as users interact with one or more software applications. In various embodiments, interactive and customizable visualizations and analyses provided by the system may be based on user interaction data aggregated across groups of users (also referred to as cohorts of users), across particular time frames, and/or from particular software and/or computer-based applications. According to various embodiments, the system may enable insights into, for example, user interaction patterns, the frequency of software application features accessed, the performance of various aspects of software applications, and/or crashes of software applications, among others.

18 Claims, 31 Drawing Sheets

Related U.S. Application Data continuation of application No. 14/095,761, filed on Dec. 3, 2013, now Pat. No. 8,812,960.

(60) Provisional application No. 61/887,799, filed on Oct. 7, 2013.

(51) Int. Cl.

| | | |
|---|---|---|
| H04L 29/12 | (2006.01) | |
| G06F 16/26 | (2019.01) | |
| G06F 16/248 | (2019.01) | |
| G06F 16/2458 | (2019.01) | |
| G06F 16/2455 | (2019.01) | |
| G06Q 10/10 | (2012.01) | |
| H04L 29/08 | (2006.01) | |
| G06F 16/435 | (2019.01) | |

(52) U.S. Cl.
CPC ........ *G06F 16/24556* (2019.01); *G06F 16/26* (2019.01); *G06Q 10/10* (2013.01); *H04L 61/6077* (2013.01); *H04L 67/306* (2013.01); *G06F 16/435* (2019.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |

(56) References Cited

U.S. PATENT DOCUMENTS

| | | |
|---|---|---|
| 8,589,273 B2 | 11/2013 | Creeden et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,683,389 B1 | 3/2014 | Bar-Yam et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,902,231 B2 | 12/2014 | Heinkel et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,933,937 B2 | 1/2015 | Nachmanson et al. |
| 8,937,619 B2 | 1/2015 | Sharma et al. |
| 8,938,686 B1 | 1/2015 | Erenrich et al. |
| 8,956,292 B2 | 2/2015 | Wekell et al. |
| 9,275,118 B2 | 3/2016 | Brezina et al. |
| 9,286,380 B2 | 3/2016 | Dowlaty et al. |
| 9,785,317 B2 | 10/2017 | Duffield et al. |
| 9,864,493 B2 | 1/2018 | Sun et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0153418 A1 | 8/2004 | Hanweck |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0260702 A1 | 12/2004 | Cragun et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Di Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0174760 A1 | 7/2007 | Chamberlain et al. |
| 2007/0192265 A1 | 8/2007 | Chopin et al. |
| 2007/0198306 A1* | 8/2007 | Crean .................... G06Q 10/02 705/5 |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0059273 A1* | 3/2008 | Miller .................... G06Q 10/04 705/7.31 |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0094399 A1 | 4/2008 | Heinkel et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0054743 A1 | 2/2009 | Stewart |
| 2009/0055251 A1 | 2/2009 | Shah et al. |
| 2009/0076845 A1* | 3/2009 | Bellin .................... G06Q 10/10 705/2 |
| 2009/0083261 A1 | 3/2009 | Nagano et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |

(56) References Cited

U.S. PATENT DOCUMENTS

| | | |
|---|---|---|
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0313463 A1 | 12/2009 | Pang et al. |
| 2009/0315890 A1 | 12/2009 | Modani |
| 2009/0319418 A1 | 12/2009 | Herz |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0088273 A1 | 4/2010 | Donaldson |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313157 A1 | 12/2010 | Carlsson et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060717 A1 | 3/2011 | Forman et al. |
| 2011/0060753 A1 | 3/2011 | Shaked et al. |
| 2011/0061013 A1 | 3/2011 | Bilicki et al. |
| 2011/0072052 A1 | 3/2011 | Skarin et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0270604 A1 | 11/2011 | Qi et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0011238 A1 | 1/2012 | Rathod |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278321 A1 | 11/2012 | Traub et al. |
| 2012/0278327 A1 | 11/2012 | Nakazawa et al. |
| 2012/0290672 A1 | 11/2012 | Robinson et al. |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0096988 A1 | 4/2013 | Grossman et al. |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0224696 A1 | 8/2013 | Wolfe et al. |
| 2013/0232452 A1 | 9/2013 | Krajec et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282889 A1 | 10/2013 | Tito |
| 2013/0290011 A1 | 10/2013 | Lynn et al. |
| 2013/0290825 A1* | 10/2013 | Arndt .................... G06Q 10/10 715/227 |
| 2013/0297619 A1 | 11/2013 | Chandarsekaran et al. |
| 2013/0311375 A1 | 11/2013 | Priebatsch |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0033120 A1* | 1/2014 | Bental .................... G06Q 30/02 715/803 |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |

(56) References Cited

U.S. PATENT DOCUMENTS

| | | |
|---|---|---|
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0136557 A1 | 5/2014 | Lilienthal |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214945 A1 | 7/2014 | Zhang et al. |
| 2014/0218383 A1 | 8/2014 | Srivastava |
| 2014/0222793 A1 | 8/2014 | Sadkin et al. |
| 2014/0249841 A1 | 9/2014 | Seward |
| 2014/0267294 A1 | 9/2014 | Ma |
| 2014/0267295 A1 | 9/2014 | Sharma |
| 2014/0279824 A1 | 9/2014 | Tamayo |
| 2014/0297690 A1 | 10/2014 | Osoekawa et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0351267 A1 | 11/2014 | Kumar |
| 2014/0366132 A1 | 12/2014 | Stiansen et al. |
| 2014/0372953 A1 | 12/2014 | Laurance |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0220535 A1 | 8/2015 | Palmer et al. |
| 2017/0364227 A1 | 12/2017 | Duffield et al. |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| GB | 2516155 | 1/2015 |
| GB | 2518745 | 4/2015 |
| NL | 2012778 | 11/2014 |
| NL | 2013306 | 2/2015 |
| WO | WO 2000/009529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Countly Mobile Analytics, <http://count.ly/> Printed Jul. 18, 2013 in 9 pages.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Distimo—App Analytics, <http://www.distimo.com/app-analytics> Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

"The FASTA Program Package," fasta-36.3.4, Mar. 25, 2011, pp. 29.

Flurry Analytics, <http://www.flurry.com/> Printed Jul. 18, 2013 in 14 pages.

GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Hua et al., "A Multi-attribute Data Structure with Parallel Bloom Filters for Network Services", HiPC 2006, LNCS 4297, pp. 277-288, 2006.

(56) References Cited

OTHER PUBLICATIONS

Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palmas et al., "An Edge-Bunding Layout for Interactive Parallel Coordinates" 2014 IEEE Pacific Visualization Symposium, pp. 57-64.
Piwik—Free Web Analytics Software. <http://piwik.org/> Printed Jul. 19, 2013 in 18 pages.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues", A129, pp. 859-864, 2001.
International Search Report and Written Opinion in Application No. PCT/US2009/056703 dated Mar. 15, 2010.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/228,109 dated Jun. 7, 2017.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Jan. 5, 2015.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14158861.6 dated Jun. 16, 2014.
Official Communication for European Patent Application No. 14159464.8 dated Sep. 22, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14186225.0 dated Feb. 13, 2015.
Official Communication for European Patent Application No. 14186225.0 dated Dec. 19, 2016.
Official Communication for European Patent Application No. 14187996.5 dated Feb. 12, 2015.
Official Communication for European Patent Application No. 14187996.5 dated Dec. 16, 2016.
Official Communication for European Patent Application No. 14187996.5 dated Feb. 19, 2016.
Official Communication for European Patent Application No. 14189344.6 dated Feb. 20, 2015.

(56) References Cited

OTHER PUBLICATIONS

Official Communication for European Patent Application No. 14189347.9 dated Mar. 4, 2015.
Official Communication for European Patent Application No. 14199182.8 dated Mar. 13, 2015.
Official Communication for Great Britain Patent Application No. 1404457.2 dated Aug. 14, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/827,491 dated Dec. 1, 2014.
Official Communication for U.S. Appl. No. 13/831,791 dated Mar. 4, 2015.
Official Communication for U.S. Appl. No. 14/035,889 dated Jan. 14, 2014.
Official Communication for U.S. Appl. No. 14/035,889 dated Feb. 6, 2014.
Official Communication for U.S. Appl. No. 14/095,761 dated Feb. 10, 2014.
Official Communication for U.S. Appl. No. 14/095,761 dated Jun. 30, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/228,109 dated Jul. 11, 2016.
Official Communication for U.S. Appl. No. 14/228,109 dated Jan. 19, 2017.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,599 dated Jul. 22, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 14/463,615 dated Jan. 28, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jan. 28, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/571,098 dated Mar. 11, 2015.
Notice of Allowance for U.S. Appl. No. 14/323,904 dated Aug. 24, 2017.
Official Communication for U.S. Appl. No. 14/323,904 dated Jun. 7, 2017.
Official Communication for U.S. Appl. No. 14/323,904 dated Mar. 9, 2017.

* cited by examiner

FIG. 1C

| USAGE | PERFORMANCE | CRASHES | | May 13, 2013 (12:00 AM) - Aug 11, 2013 (11:59 PM) |
|---|---|---|---|---|

FEATURES

Search [All] [None]
- ☑ ALPR helper
- ☑ Browser
- ☑ Doc Search
- ☑ Document
- ☑ Easy search helper
- ☑ Filter
- ☑ Geo Search — 142 — Back to cohorts | AB

| User Name | ALPR helper | Browser | Doc Search | Document | Easy search helper |
|---|---|---|---|---|---|
| a1 | 0 | 1 | 0 | 0 | 0 |
| a10 | 0 | 0 | 0 | 0 | 0 |
| a2 | 0 | 0 | 0 | 0 | 0 |
| a3 | 0 | 0 | 0 | 0 | 0 |
| a4 | 0 | 0 | 0 | 0 | 0 |
| a5 | 0 | 0 | 0 | 0 | 0 |
| a6 | 0 | 0 | 0 | 0 | 0 |
| a7 | 0 | 0 | 0 | 0 | 0 |
| a8 | 0 | 0 | 0 | 0 | 0 |
| a9 | 0 | 0 | 0 | 0 | 0 |

USERS

Search [All] [None]
- ☑ a1
- ☑ a10
- ☑ a2
- ☑ a3
- ☑ a4
- ☑ a5
- ☑ a6

— 144

| | USAGE | PERFORMANCE | CRASHES | | | | | |
|---|---|---|---|---|---|---|---|---|
| FEATURES | | Absolute / Relative | Percentile [50th][90th][99th] | Jul 30, 2013 (12:00 AM) - Aug 28, 2013 (11:59 PM) ▽ | | | | |
| Search [All][None] | | Cohort Name | Cohort Size | Doc Search Perf(sec) (count) | Document Perf(sec) (count) | Geo Search Perf(sec) (count) | Histogram Load Perf(sec) (count) | Share Graph Perf(sec) (count) |
| ☐ All perf metrics | | Overall | 1055 | 7.32 (6) | 1.44 (114) | 4.21 (12) | 11.52 (41) | 13.1 (6) |
| ☑ Doc Search | | April 2013 Person Search Classes | 9 | - (0) | - (0) | - (0) | - (0) | - (0) |
| ☑ Document | | April 2013 Vehicle Search Classes | 12 | - (0) | - (0) | - (0) | - (0) | - (0) |
| ☐ Filter | | Unassigned | 12 | 3.64 (3) | 0.79 (28) | 2.46 (5) | 4.35 (18) | 11.37 (6) |
| ☑ Geo Search | | | | | | | | |
| ☐ Graph Drag | | | | | | | | |
| ☑ Histogram Load | | | | | | | | |
| COHORTS | | | | | | | | |
| Search [All][None] | | | | | | | | |
| ☑ Overall | | | | | | | | |
| ☐ 100 | | | | | | | | |
| ☐ 11 | | | | | | | | |
| ☐ 77th Street | | | | | | | | |
| ☐ AB | | | | | | | | |
| ☐ AB and Admins | | | | | | | | |
| Combine Cohorts | | | | | | | | |

FIG. 6B

| | | Jul 30, 2013 (12:00 AM) - Aug 28, 2013 (11:59 PM) ▽ | | | | | | | | |
|---|---|---|---|---|---|---|---|---|---|---|
| FEATURES | Absolute \| Relative | Percentile | 50th \| 90th \| 99th | | | | | | | |
| | Cohort Name | Cohort Size | Doc Search | | Document | | Geo Search | | Histogram Load | | Share Graph |
| Search [All][None] | | | Perf(sec) | (count) | Perf(sec) | (count) | Perf(sec) | (count) | Perf(sec) | (count) | Perf(sec) | (count) |
| □ All perf metrics | Overall | 1055 | 10.09 | (6) | 3.41 | (114) | 7.25 | (12) | 37.13 | (41) | 13.68 | (26) |
| ☑ Doc Search | April 2013 Person Search Classes | 9 | - | (0) | - | (0) | - | (0) | - | (0) | - | (0) |
| ☑ Document | | | | | | | | | | | | |
| □ Filter | April 2013 Vehicle Search Classes | 12 | - | (0) | - | (0) | - | (0) | - | (0) | - | (0) |
| ☑ Geo Search | | | | | | | | | | | | |
| □ Graph Drag | Unassigned | 12 | 3.77 | (3) | 2.04 | (28) | 3.65 | (5) | 10.4 | (18) | 12.9 | (6) |
| ☑ Histogram Load | | | | | | | | | | | | |

COHORTS

Search [All][None]
☑ Overall
□ 100
□ 11
□ 77th Street
□ AB
□ AB and Admins

Combine Cohorts

FIG. 6C

| | USAGE | PERFORMANCE | CRASHES | | | | | | | |
|---|---|---|---|---|---|---|---|---|---|---|
| FEATURES | | | Absolute | Relative —642 | Percentile | 50th | 90th | 99th | | |
| Search | All | None | – Back to cohorts | | | | | | | |
| ☐ All perf metrics | | | User Name | Doc Search Perf(sec) (count) | Document Perf(sec) (count) | Geo Search Perf(sec) (count) | Histogram Load Perf(sec) (count) | Share Graph Perf(sec) (count) | | |
| ☑ Doc Search | | | 640 | | | | | | | |
| ☑ Document | | | sb83 | - (0) | 0.26 (5) | 0.17 (1) | 2.28 (2) | - (0) | | |
| ☐ Filter | | | sb81 | - (0) | 0.21 (14) | 0.77 (2) | 1.06 (13) | 10.24 (2) | | |
| ☑ Geo Search | | | sb85 | 1.76 (2) | 0.07 (9) | 0.56 (1) | 1.46 (1) | 0.67 (4) | | |
| ☐ Graph Drag | | | jscheiny4 | - (0) | - (0) | - (0) | - (0) | - (0) | | |
| ☑ Histogram Load | | | raa2 | - (0) | - (0) | - (0) | - (0) | - (0) | | |
| USERS —643 | | | sb80 | - (0) | - (0) | - (0) | - (0) | - (0) | | |
| Search | All | None | jscheiny2 | - (0) | - (0) | - (0) | - (0) | - (0) | | |
| ☑ jscheiny | | | sb82 | - (0) | - (0) | 1.89 (1) | 4.21 (2) | - (0) | | |
| ☑ jscheiny2 | | | jscheiny | - (0) | - (0) | - (0) | - (0) | - (0) | | |
| ☑ jscheiny3 | | | jscheiny3 | - (0) | - (0) | - (0) | - (0) | - (0) | | |
| ☑ jscheiny4 | | | | | | | | | | |
| ☑ raa2 | | | | | | | | | | |
| ☑ sb80 | | | | | | | | | | |
| ☑ sb81 | | | | | | | | | | |

| | USAGE | PERFORMANCE | CRASHES | | Jul 30, 2013 (12:00 AM) - Aug 28, 2013 (11:59 PM) ▽ |

WORKSPACE CRASHES QUEUE — 702

— 704

| Username | Cause | Time |
|---|---|---|
| admin | oom | Aug 21, 2013 (3:17 PM) |
| mmm | awt/Lock/error | Aug 26, 2013 (5:32 PM) |
| mmm | awt/Lock/warning | Aug 26, 2013 (5:28 PM) |
| mmm | awt/Lock/error | Aug 26, 2013 (5:32 PM) |
| mmm | awt/Lock/warning | Aug 26, 2013 (5:34 PM) |
| mmm | awt/Lock/error | Aug 26, 2013 (5:34 PM) |
| mmm | awt/Lock/warning | Aug 26, 2013 (5:35 PM) |
| mmm | awt/Lock/warning | Aug 26, 2013 (5:31 PM) |
| mmm | awt/Lock/error | Aug 26, 2013 (5:28 PM) |
| mmm | awt/Lock/error | Aug 26, 2013 (5:31 PM) |
| mmm | awt/Lock/warning | Aug 26, 2013 (5:29 PM) |
| mmm | awt/Lock/error | Aug 26, 2013 (5:34 PM) |
| ab85 | awt/Lock/warning | Aug 13, 2013 (11:08 AM) |
| ab85 | awt/Lock/warning | Aug 13, 2013 (12:16 PM) |
| ab85 | oom | Aug 13, 2013 (11:31 AM) |
| admin | oom | Aug 21, 2013 (3:28 PM) |

FIG. 7

COHORT-BASED PRESENTATION OF USER INTERACTION DATA

CROSS-REFERENCE TO RELATED APPLICATIONS

This application is a continuation of U.S. patent application Ser. No. 14/323,904, filed on Jul. 3, 2014, and titled "COHORT-BASED PRESENTATION OF USER INTERACTION DATA," which application is a continuation of U.S. patent application Ser. No. 14/095,761, filed on Dec. 3, 2013, and titled "COHORT-BASED PRESENTATION OF USER INTERACTION DATA," which application claims a priority benefit under 35 U.S.C. § 119 to U.S. Provisional Patent Application No. 61/887,799, filed on Oct. 7, 2013, and titled "COHORT-BASED PRESENTATION OF USER INTERACTION DATA," which is hereby incorporated by reference herein in its entirety.

TECHNICAL FIELD

The present disclosure relates to systems and techniques for user data integration, analysis, and visualization. More specifically, the present disclosure relates to cohort-based user interaction data integration, analysis, presentation, and visualization.

BACKGROUND

In the area of computer-based platforms and software application, user interaction data may be collected, analyzed, and/or presented with the goal of understanding and improving particular aspects of user interactions. For example, in a software application-based context, user interaction data may include various metrics including a number of times that a user performs a particular action (for example, clicks a button), a frequency with which a user utilizes particular functionality, and/or various other types of interactions of the user with the software application, among others.

SUMMARY

Such user data (also referred to as user interaction data) may be aggregated across many users. The user interaction data may then be analyzed by, and presented to, for example, an operator. In general, the term "analytics" may describe one or more processes of user interaction data collection, analysis, presentation, and/or other analysis of such data that may provide insights to the user. Certain systems, methods, and devices of the present disclosure provide, among other features, interactive, customizable, user interaction data analysis. Such systems may be configured to provide cohort-based analysis and/or graphical visualizations of user interaction data to a system operator. User interaction data is obtained, for example, as users interact with one or more software applications. In various embodiments, interactive and customizable visualizations and analyses provided by the system may be based on user interaction data aggregated across groups of users (also referred to as cohorts of users), across particular time frames, and/or from particular software and/or computer-based applications. According to various embodiments, the system may enable insights into, for example, user interaction patterns, the frequency of software application features accessed, the performance of various aspects of software applications, and/or crashes of software applications, among others.

According to an embodiment, a computer system is disclosed comprising: one or more computer readable storage devices configured to store: one or more software modules including computer executable instructions; and at least one set of user interaction data collected from interactions of a plurality of users with a software application; and one or more hardware computer processors in communication with the one or more computer readable storage devices and configured to execute the one or more software modules in order to cause the computer system to: determine, based on preferences received from an operator of the computer system or predefined preferences, two or more groups of the plurality of users, at least one of the groups including multiple of the plurality of users; access, from the one or more computer readable storage devices and by the one or more hardware computer processors, the user interaction data of the plurality of users in the two or more groups; and generate, based on the accessed user interaction data, an interactive user interface configured for display on an electronic display of the computer system, the interactive user interface including at least: an indication of the two or more groups; and for each of the two or more groups, a visualization of a relationship between one or more features and users in the group based on the accessed user interaction data related to interactions of users in the group with the software application.

According to an embodiment, a computer system is disclosed comprising: one or more computer readable storage devices configured to store one or more software modules including computer executable instructions; and one or more hardware computer processors in communication with the one or more computer readable storage devices and configured to execute the one or more software modules in order to cause the computer system to: access, from one or more data stores, user interaction data collected from interactions of a plurality of users with features of one or more software applications; receive, from an operator of the computer system and via a user interface of the computer system, a selection of a group of users from the plurality of users; generate a data visualization based on user interaction data drawn from the set of user interaction data and associated with the selected group of users; and display the generated visualization on an electronic display of the computer system.

According to an embodiment, a computer system is disclosed comprising: one or more computer readable storage devices configured to store one or more software modules including computer executable instructions; and one or more hardware computer processors in communication with the one or more computer readable storage devices and configured to execute the one or more software modules in order to cause the computer system to: access, from one or more data stores, a set of user interaction data comprising data collected from interactions of users with one or more software applications; determine, based on preferences received from an operator of the computer system or predefined preferences, two or more groups of the users, at least one of the groups including multiple of the users; receive, from the operator of the computer system and via a user interface of the computer system, one or more filter criteria to be applied to the set of user interaction data; determine a filtered set of user interaction data comprising user interaction data from the set of user interaction data that meets the one or more filter criteria; determine which of the two or more groups of users include users having associated user interaction data from the filtered set of user interaction data; display, on an electronic display of the computer system, a list of the determined groups of users having associated user interaction data from the filtered set of user interaction data; and display, on the electronic display, a data visualization based on the filtered set of user interaction data.

The systems, methods, and devices described herein each have several aspects, no single one of which is solely responsible for its desirable attributes. Without limiting the scope of this disclosure, several non-limiting features will now be discussed briefly.

BRIEF DESCRIPTION OF THE DRAWINGS

The following aspects of the disclosure will become more readily appreciated as the same become better understood by reference to the following detailed description, when taken in conjunction with the accompanying drawings.

FIGS. 1A-1C illustrate sample user interfaces of the user interaction data analysis system, according to embodiments of the present disclosure.

FIGS. 6A-6E illustrate additional sample user interfaces of the user interaction data analysis system in which performance data is presented, according to embodiments of the present disclosure.

FIG. 7 illustrates an additional sample user interface of the user interaction data analysis system in which crash data is presented, according to embodiments of the present disclosure.

DETAILED DESCRIPTION OF SPECIFIC EMBODIMENTS

Figure 1A:
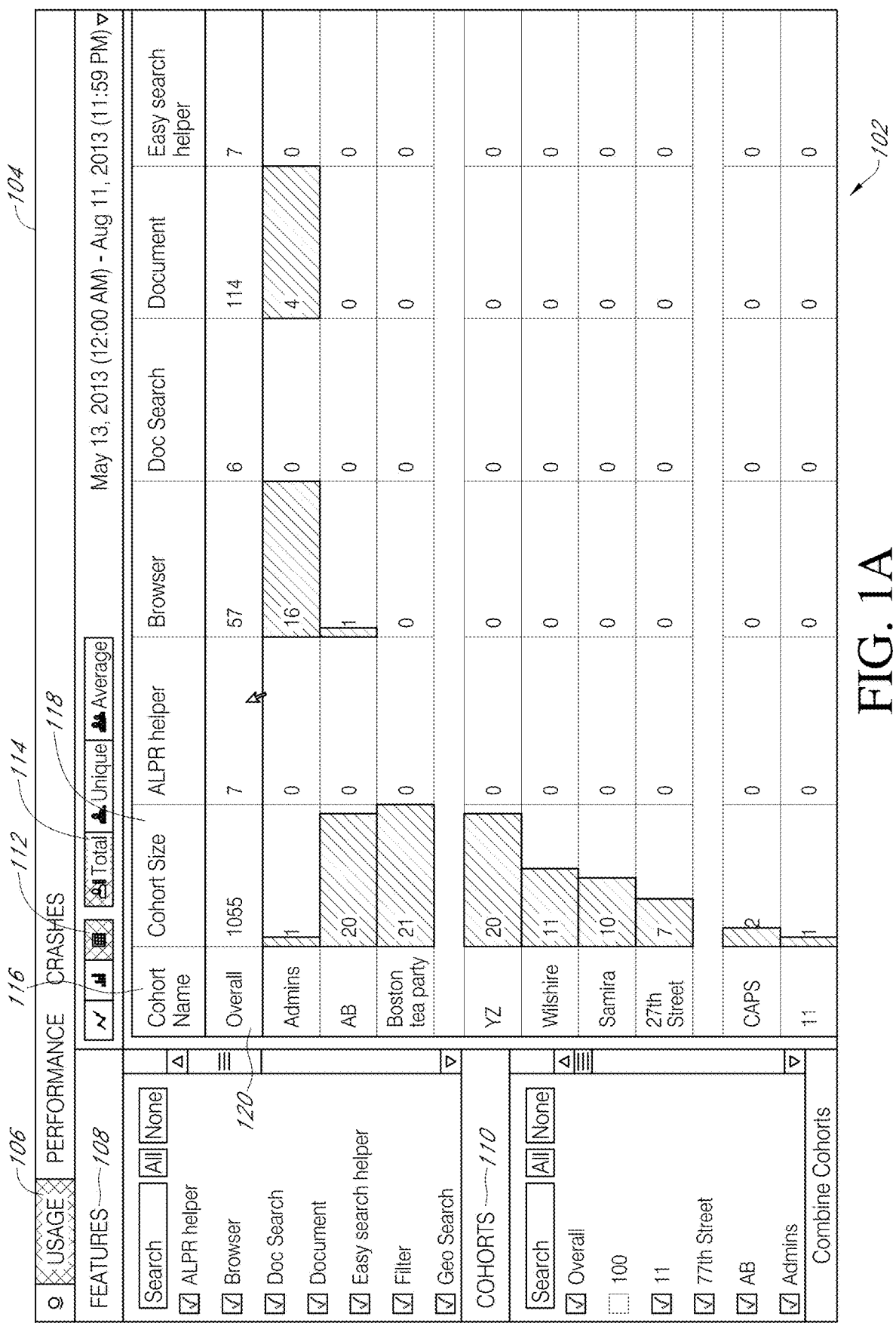

In order to facilitate an understanding of the systems and methods discussed herein, certain terms may be defined in this document. Such terms should be construed to include the provided definitions, the ordinary and customary meaning of the terms, and/or any other implied meaning for the respective terms. Accordingly, any definitions provided herein do not limit the meaning of the defined terms, but only provide exemplary definitions.

Overview

An interactive, customizable, user interaction data analysis system ("the system," which refers to any embodiment or combination of embodiments of user interaction data analysis systems disclosed herein) is disclosed. The system may be configured to provide cohort-based analysis and/or graphical visualizations of user interaction data to a system operator (or one or more operators). User interaction data may be obtained, for example, as users interact with one or more software applications (for example, as users select user interface buttons, or activate particular functionality and/or features of the software applications, among others). In various embodiments, interactive and customizable visualizations and analyses provided by the system may be based on user interaction data aggregated across groups of users (also referred to as cohorts of users), across particular time frames, and/or from particular software and/or computer-based applications. According to various embodiments, the system may enable insights into, for example, user interaction patterns, the frequency of software application features accessed, the performance of various aspects of software applications, and/or crashes of software applications, among others. In various embodiments, the system allows an operator to analyze and investigate user interaction data on a user-by-user basis or a group-by-group (cohort-by-cohort) basis.

In an embodiment, data is collected by the system from user interactions with one or more software applications at various computing devices and/or mobile computing devices. The system then processes the user interaction data and provides an interactive user interface to one or more operators (such as system administrators, information technology personnel, managers/engineers/others responsible for a software application being monitored, and/or other interested persons) through which the user interaction data may be displayed and inputs may be received. In an embodiment, the system comprises software including one or more software modules. The software modules may be stored on one or more media devices, and may be executable by one or more processors. The software modules may include modules for collecting user interaction data, processing the data, displaying a user interface to the operator of the system, and/or receiving inputs from the operator.

In various embodiments, the software applications from which user interaction data may be gathered may include, for example, operating systems, data analysis applications, visualization applications, map applications, web browser applications, embedded applications, word processing or spreadsheet applications, database applications, graphics applications, and/or communications applications, among others.

In various embodiments, user interaction data may include, for example, usage data, performance data, and/or crash data, among other types of data. Usage data may include, for example, information regarding users' usage or accesses of particular features of a software application. For example, in an embodiment, each time a user selects a particular button, accesses a particular type of data, and/or activates a particular feature of the software application, data regarding that user action is collected as usage data by the system. Performance data may include, for example, information regarding performance of a software application in response to interactions of the users. For example, performance data may indicate that the software application took some amount of time (for example, three seconds, or some other amount of time) to perform an operation, such as access a particular piece of data or perform a calculation, in response to an input from a user. Crash data may include, for example, information regarding crashes of a software application. Crashes of the software application may include, for example, instances in which the software application becomes unusable, improperly no longer accepts user input, and/or generally functions improperly or requires restarting.

In various embodiments, the interactive user interface of the system includes user interaction data displayed in the form of tables, graphs, and/or bar graphs, among others. A table may display, for example, the number of times a user and/or group of users accesses and/or interacts with particular features of the software application(s). In another example, a table may indicate the performance of the software application(s) in connection with a user and/or group of users accessing and/or interacting with particular features of the software application(s). In yet another example, a graph and/or bar graph may indicate user and/or user-group usage of particular features of the software application(s) over time. In all of the above examples, the interactions of particular users and/or groups of users may be compared to one another. Additionally, in various embodiments, an operator of the system may specify particular groups of interest for comparison, may specify particular software application features of interest, and/or may specify particular time frames of interest, among other options.

In an embodiment, user interaction data may be organized by user. For example, user interaction data may be collected from one or more software applications in which users of the software applications may be identified by a username and/or some other unique identifier. The collected user interaction data may then be stored in, for example, a database or other data store and may be indexed according to the usernames of the users. Accordingly, user interaction data specific to a particular user of the software applications may be accessed by the system, such as to provide an operator with insights into how particular users interact with one or more software applications.

As mentioned above, user interaction data may be organized by groups of users. A group of users may comprise, for example, one or more users of the software applications mentioned above. Groups of users are generally referred to herein as cohorts. Cohorts may be determined automatically by the system and/or manually by the operator of the system. A cohort may comprise a group of logically associated users and/or a cohort may comprise an arbitrary group of users. Organizing users, and thereby user interaction data, into cohorts enables, for example, analysis by the system and/or the operator of the system of grouped or aggregated user interaction data. For example, the usage patterns of a first cohort may easily be compared to a second cohort. In an embodiment, any particular user may be included in more than one cohort.

User Interaction Data Collection

As an illustrative non-limiting example, the user interaction data analysis system may be useful for analysis of user interactions with a word processing application. In this example, usage data of interest may include, for example, a number times a user interacts with particular features of the word processing application such as: a formatting options window, a spellcheck feature, a font selection dropdown, a word count tool, a font color button, a save button, etc. Each item of usage data may additionally include, for example, an associated user, a timestamp, and/or other contextual information useful for later analysis. In this example, performance data may include, for example, an amount of time the word processing application takes to perform an action or task in response to an interaction of the user such as: a time to complete a word count, a time to save a document, etc. Similar to the usage data above, each item of performance data may additionally include, for example, an associated user, a timestamp, and/or other contextual information useful for later analysis. In this example crash data may include, for example, a time and cause associated with a word processing application crash, as well as an associated user, a crash dump file with details related to operation of the application at the time of the crash, and/or other contextual information useful for later analysis.

In an embodiment, the user interaction data (including the usage data, the performance data, and/or the crash data) associated with the word processing application is recorded and/or stored in a data store or other storage medium in a database (or other data structure) and/or log file. In an embodiment, a software application developer may write software code "hooks" into the software application to cause particular events or user interactions to be recorded by the system. For example, the developer may include a "hook" associated with an event comprising the user selecting a save button. Then, when the user is interacting with the software application and selects the save button, the event is recorded as usage data. Similarly, the developer may include "hooks" to record software performance data, crash data, and/or other data that may be interesting for analysis and visualization in one or more user interfaces.

The events, items, interactions, hooks, etc., that are tracked as user interactions by the system may be referred to generally as "features." A feature may comprise, for example, a button the user selects, an interface the user interacts with, an aspect of the application the user accesses, and/or a type of data the user accesses, among others.

In an embodiment, the system is configured to automatically record user interaction data associated with a software application without the addition of particular "hooks" by a developer. In an embodiment, a set of default user interactions may be recorded with respect to a particular software application, and a developer may include "hooks" for any additional interactions that are to be tracked.

In an embodiment, the system records the user interactions as they happen in a log file. In this embodiment, the log file may be converted to another format, moved to another storage location, combined with other log files (e.g., of other software applications and/or users, and/or converted to a database format, before being accessed for presentation to an operator in a user interface. In an embodiment, user interactions are recorded directly to a database where they may be accessed by the system for presentation to the operator in the user interface.

In an embodiment, user interaction data is associated with specific users. As mentioned above, users may be identified by a username, user identification, and/or some other identifying information. In reference to the word processing software example, a user of the word processing software application may be required to log in to the application by providing a username. That provided username may then be associated with the interaction data collected. In another embodiment, user identifying information may be drawn from the operating system or computing device on which the application is running. For example, an operating system username, an Internet Protocol (IP) address, a MAC address, a geographic location (for example, GPS derived coordinates), and/or any other identifying information may be associated with collected user interaction data.

In various embodiments, user interaction data may be collected for one user, many users, many groups of users, users in disparate geographic locations, users of multiple software applications, users of multiple versions of software applications, user having differing access scopes (for example, differing rights to access types of data or software features), users of multiple organizations, and/or any other types or groups of users and software applications. In an embodiment, user interaction data may be partitioned, encrypted, and/or otherwise protected according to one or more of: the source from which the user interaction data was collected, the type of software application from which the user interaction data was collected, the authority or access scopes of the users, among others. In various embodiments, user interaction data may be stored in one or multiple sets, in one or more locations, and on one or more data storage devices. In an embodiment, user interaction data may be collected anonymously, and/or may not be associated with a particular user.

In various embodiment, and as is described below, collected user interaction data is access by the system and presented in user interfaces to an operator for viewing and analysis. In an embodiment, the user interface of the system may be updated in real-time as user interaction data is collected from one or more software applications.

Sample User Interfaces

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Many of the following described figures illustrate sample user interfaces of the user interaction data analysis system. In various embodiments, the user interfaces described below may be displayed in any suitable computer system and/or application, for example, in a web browser window and/or a standalone software application, among others. Additionally, the functionality and/or user interfaces of the system as shown in any of the following figures may be implemented in one or more computer modules and/or processors, as is described below with reference to FIGS. 10A-10B.

Figure 1B:
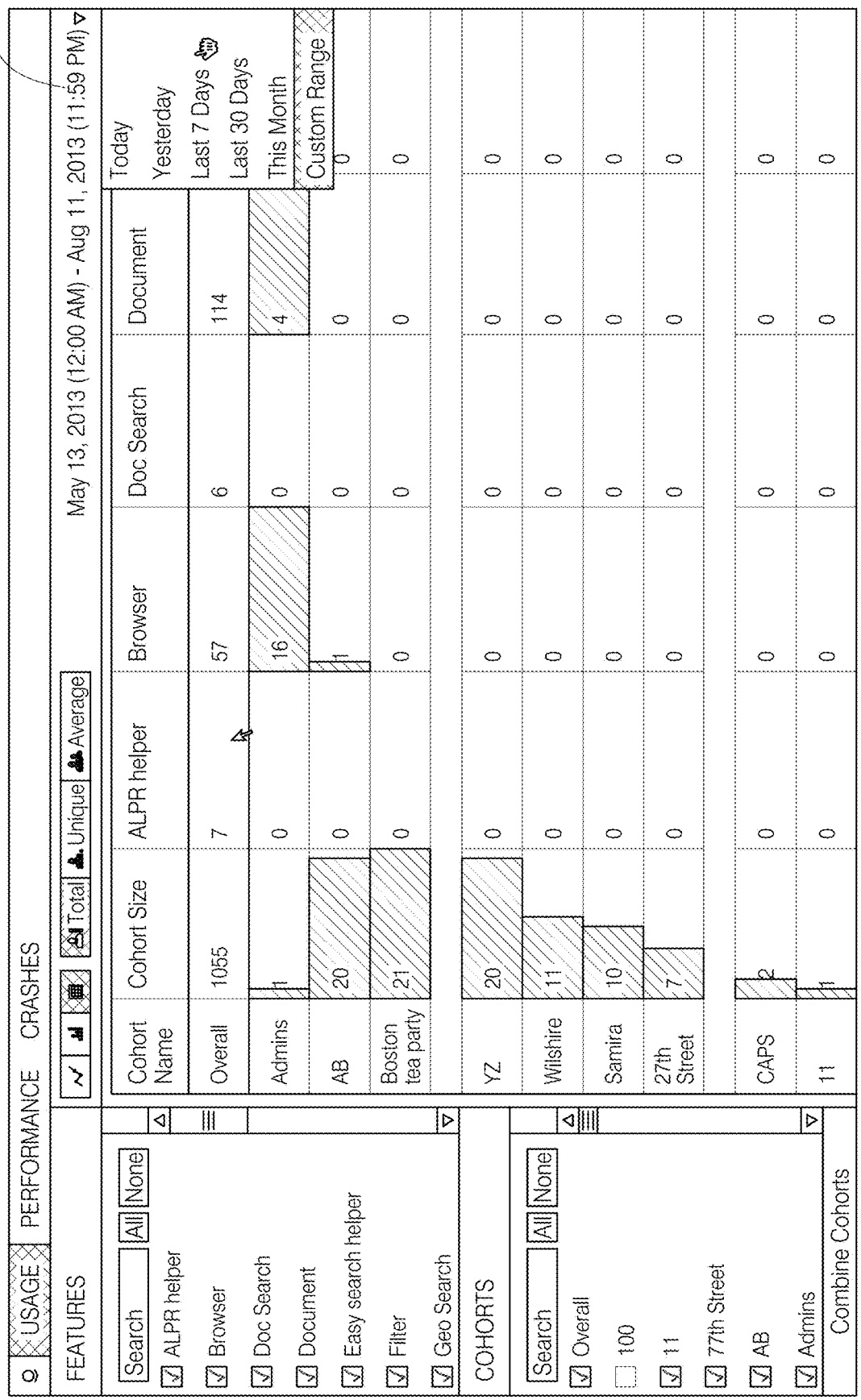

FIGS. 1A-1C illustrate sample user interfaces of the user interaction data analysis system, according to embodiments of the present disclosure. Referring to FIG. 1A, the example user interface 102 includes an analysis selection bar 104 (including selection options: Usage 106, Performance, and Crashes), a features sidebar 108, a cohorts sidebar 110, visualization selection buttons (including table selection button 112), data calculation buttons (including Total calculation button 114), and a table including columns of features (for example, ALPR Helper, Browser, etc.) and rows of cohorts (for example, Overall, Admins, etc.). In the example, the left-most column 116 of the table includes cohort names (for example, in second row, a cohort named "Overall" 120), the second column 118 of the table includes cohort sizes (for example, the "Overall" cohort is shown to include 1055 users), while the remaining columns indicate data associated with various features.

In operation, in the example of FIG. 1A, the operator has selected the Usage button 106 from the analysis selection bar 104. Selection of the Usage button 106 causes the system to access usage data of the user interaction data and display one or more visualizations related to the accessed usage data, as is described below. As mentioned above, usage data may include, for example, information regarding users' usage or accesses of particular features of one or more software applications. In FIG. 1A, the various features tracked by the system are listed in the features sidebar 108. The listed features include, for example, ALPR helper, Browser, Doc Search, Document, Easy Search Helper, Filter, and Geo Search. Each of these listed feature names is associated with a particular aspect of the tracked software application with which users have interacted, and for which data may be displayed.

Additionally, in the example of FIG. 1A, the operator has selected the table selection button 112. Selection of the table selection button 112 causes the system to display a table visualization of the user interaction data, as is described below.

As further shown in FIG. 1A, the operator may select one or more of the features listed in features sidebar 108 by selecting the check box to the left of each feature name. Selecting a feature causes usage data associated with that feature to be displayed in the visualization, in this example the table. For example, for each feature selected, a column may be added to the table that displays user interaction data associated with each cohort in respective rows of the table. Additionally, the operator may search for particular features by using the search box in the features sidebar 108, and/or may scroll down to see additional listed features by using the scrollbar of the features sidebar 108.

Various cohorts (groups of users) available for selection by the operator are listed in the cohorts sidebar 110. Similar to the features sidebar 108, the cohorts listed in the cohorts sidebar 110 may each be selected or deselected by the operator, searched, and/or scrolled through. In various embodiments, cohorts listed in the cohorts sidebar 110 may be automatically created by the system and/or may be manually created by the operator. For example, in an embodiment, the system provides an interface through which the operator may select particular users (by selection of their associated user identifying information) and may group them into a cohort. In an embodiment, the operator may select a name for each cohort created. In an embodiment, particular cohorts are automatically created, while others are manually created. For example, the system may automatically include an "Overall" cohort that includes every available user, and an "Unassigned" cohort that includes any users not already assigned to another cohort (besides "Overall"). In the example of FIG. 1A, the listed cohorts include Overall, 100, 11, 77th Street, AB, and Admins. The 100 cohort is unselected, while the other listed cohorts are selected.

As shown, the selected cohorts are listed in the visualization, in this example, respective rows of the table, with related user interaction data (also referred to as "interaction metrics" or "metrics" herein) shown in each column of each row. The type of metric shown in the table may be determined by the operator's selection of one the data calculation buttons. In the example of FIG. 1A, the operator has selected the Total calculation button 114. Selection of the Total calculation button 114 causes the system to display metrics that indicate a total number of interactions of all users in a given cohort with a particular feature. For example, the table indicates that the Overall cohort (shown in row two of the table) has a cohort size of 1055, has had 7 interactions with the ALPR Helper feature, has had 57 interactions with the Browser features, etc. As the Overall cohort includes all users for which user interaction data is available, the metrics associated with the Overall cohort are the largest of any available cohort. In another example, the table indicates that the AB cohort (shown on row four of the table) has a cohort size of 10, has had 0 interactions with the ALPR Helper feature, has had 1 interaction with the Browser features, etc.

For each of the cells of the table in FIG. 1A, the cells may be filled with a color and/or texture that visually indicates the size of respective metrics. In an embodiment, for each feature/column, the portion of each cell that is filled is proportional to the largest metric shown on the table in the particular column, with the exception of the metrics associated with the Overall cohort. For example, for the Browser feature column of the table, the largest metric, 16, which is associated with the Admins cohort, is the largest metric in that column and, thus, the entire associated cell is filled. The cell associated with the Browser metric of the AB cohort, 1, is accordingly one-sixteenth filled, as the portion filled is proportional to the largest metric 16. Similarly, the cells associated with the Cohort Size column are filled proportional to the metric associated with the Boston Tea Party cohort, 21.

Turning to FIG. 1B, dropdown 130 allows the operator to select a particular time period from which user interaction data is to be displayed. For example, the operator may select to view only user interaction data from Today (the present day), Last 7 Days, Last 30 Days, This Month (the current month), or Custom Range (in which the operator can define a start and end date). When the operator has selected a particular date range, the range is shown at indication 130, and user interaction data displayed in the present visualization (in FIG. 1B, a table) is limited to the selected time range.

Any of the cohorts listed in the table of FIG. 1A may be selected by the operator to cause the system to display a list of users associated with the selected cohort, as shown in FIG. 1C. In FIG. 1C, the operator has selected to view the users of the "AB" cohort and their associated user interaction data. For example, table 140 lists various users (for example, a1, a10, a2, a3, etc.) and associated metrics. The operator may select the "Back to cohorts" button 142 to go back to table of FIG. 1A that lists each cohort. In an embodiment, the cohorts sidebar may automatically change to a users sidebar 144, which lists each of the users of the currently viewed cohort. The operator may optionally, select or deselect one or more of the users listed in the users sidebar 144. Deselection of users in the users sidebar 144 causes information related to the deselected user to not be displayed in the table 140.

In various embodiments, and throughout the present disclosure, the term "visualization" may be used to refer to any aspect of the data displayed to the operator (for example, via the user interface) so as to enable the operator to understand, analyze, and/or visualize the user interaction data. For example, in the context of the table of FIG. 1A, the term "visualization" may refer to a cell of the table, a number or text in a cell of the table, a fill in a cell of the table, a particular column and/or row of the table, a portion of the table, a group of cells of the table, and/or any other aspect of the data displayed to the operator. In other contexts and in other data displays and visualizations (as described in reference to the figures below) the term "visualization" may likewise refer to any aspect and/or group of aspects of any chart, table, line graph, bar graph, other type of graph, and/or animation, among other data display possibilities.

Combining Cohorts

Figure 2A:
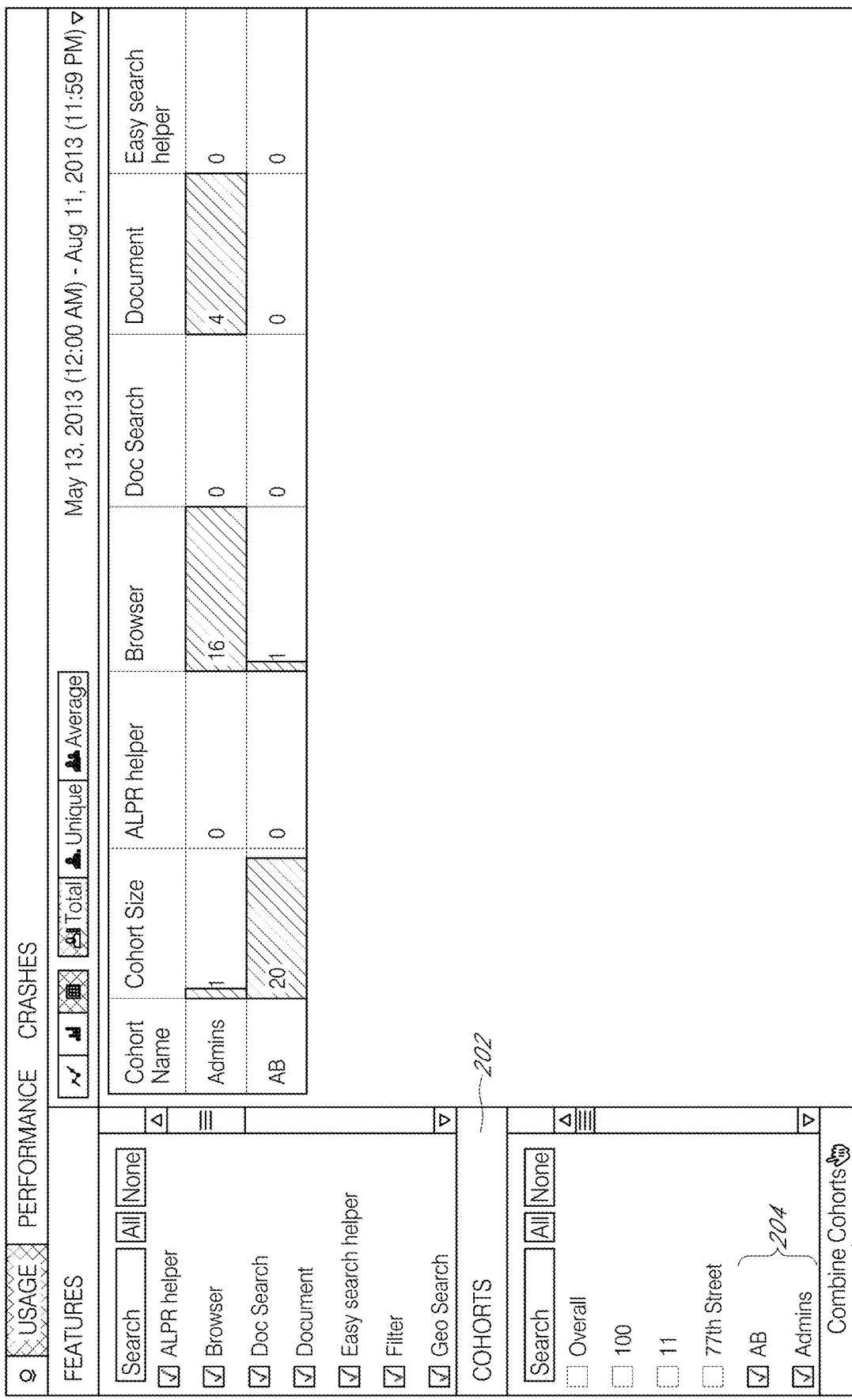
FIGS. 2A-2C illustrate additional sample user interfaces of the user interaction data analysis system in which user cohorts are combined, according to embodiments of the present disclosure.
Figure 2B:
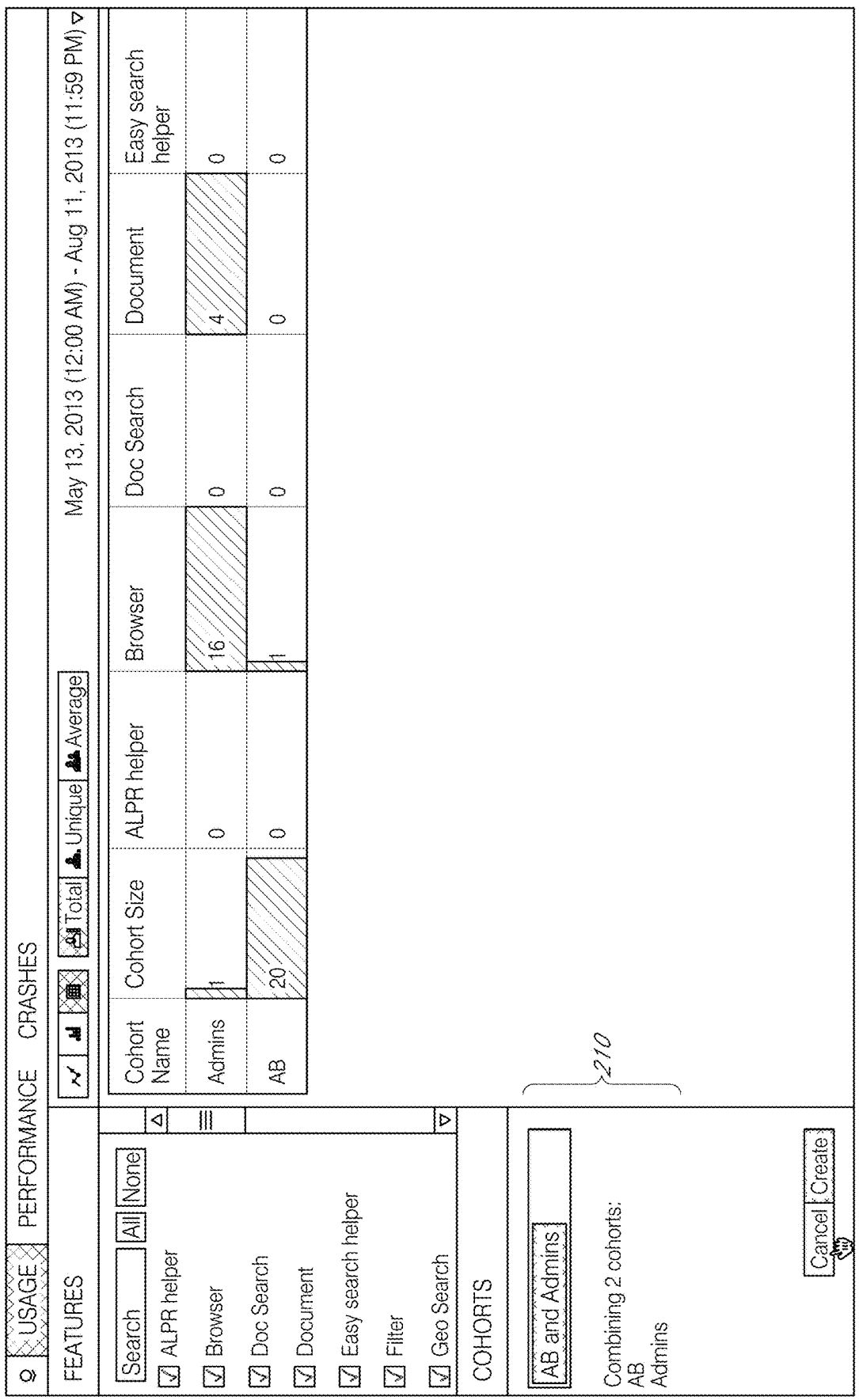
Figure 2C:
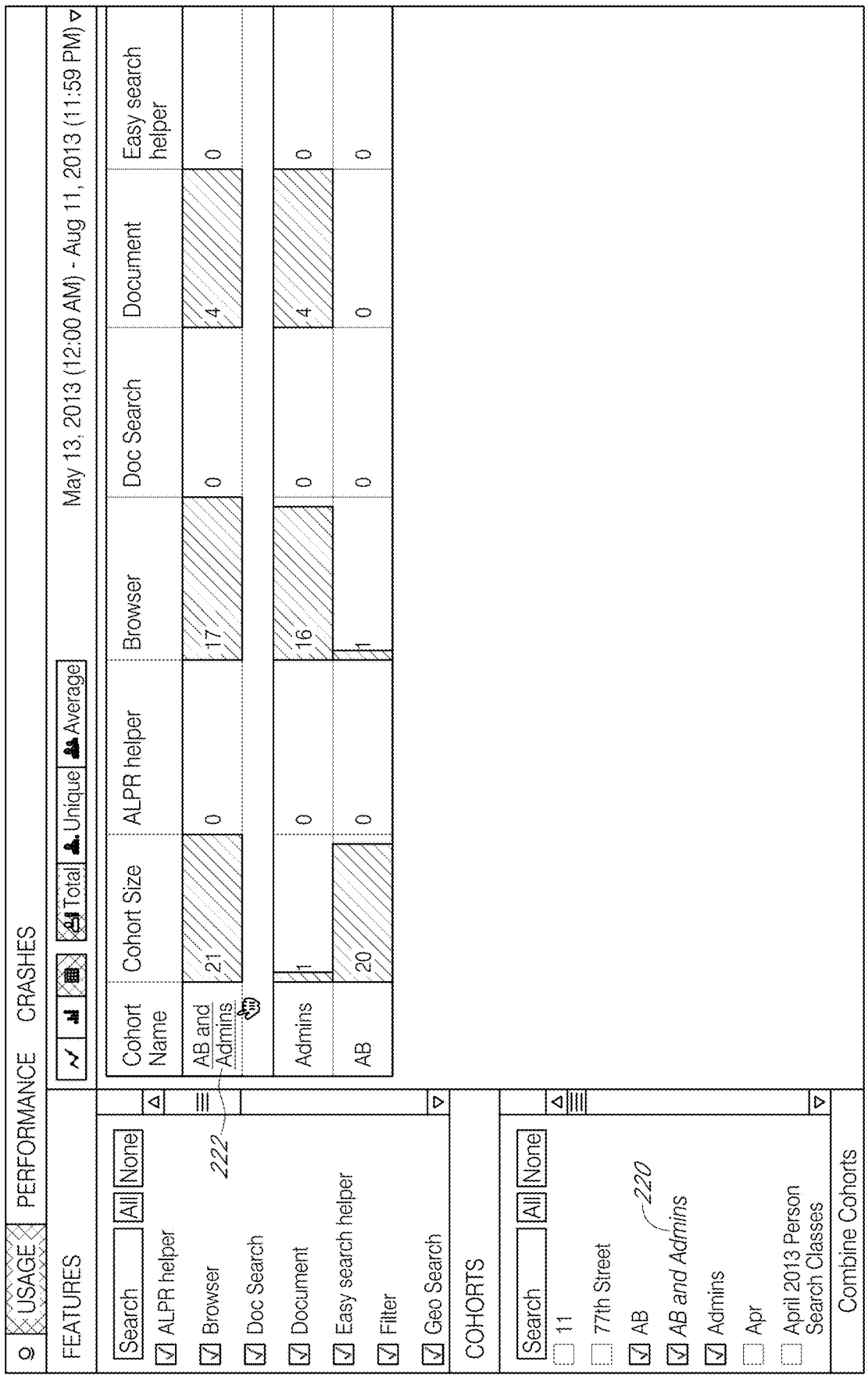

FIGS. 2A-2C illustrate additional sample user interfaces of the user interaction data analysis system in which user cohorts are combined, according to embodiments of the present disclosure. In various embodiments, the operator of the system may desire to combine two or more cohorts together to analyze and visualize user interaction data associated with the combined cohort. Combining cohorts may be accomplished as shown in FIGS. 2A-2C.

The user interface of FIG. 2A include a cohorts sidebar 202, in which two cohorts are currently selected at 204: AB and Admins. The operator may select the Combine Cohorts button 206, which results in the user interface of FIG. 2B. As shown at 210 of FIG. 2B, the user interface indicates that the AB and Admin cohorts are going to be combined, and provides the operator the option of naming the combined cohorts. The operator may then select the "Create" button to cause the combined cohort to be created. FIG. 2C shows the combined cohort "AB and Admin" 220 added to the cohorts sidebar of the user interface. Additionally, as the AB and Admin cohort is selected, metrics associated with the combined cohort are shown in the table at 222. It may be observed that the metrics associated with the combined cohort are a sum of the metrics of each individual cohort. Additionally, in an embodiment, combinations of cohorts listed in the cohorts sidebar may include one or more differentiating factors so that they may be distinguished from regular cohorts. For example, in FIG. 2C, the "AB and Admins" cohort is italicized so that the operator may understand that that cohort is comprised of a combination of other cohorts. In an embodiment, the operator may select the combined cohort 222 in the table to view, for example, a list of users related to the combined cohort, and/or a list of cohorts that make up the combined cohort.

Table Visualization

Figure 3A:
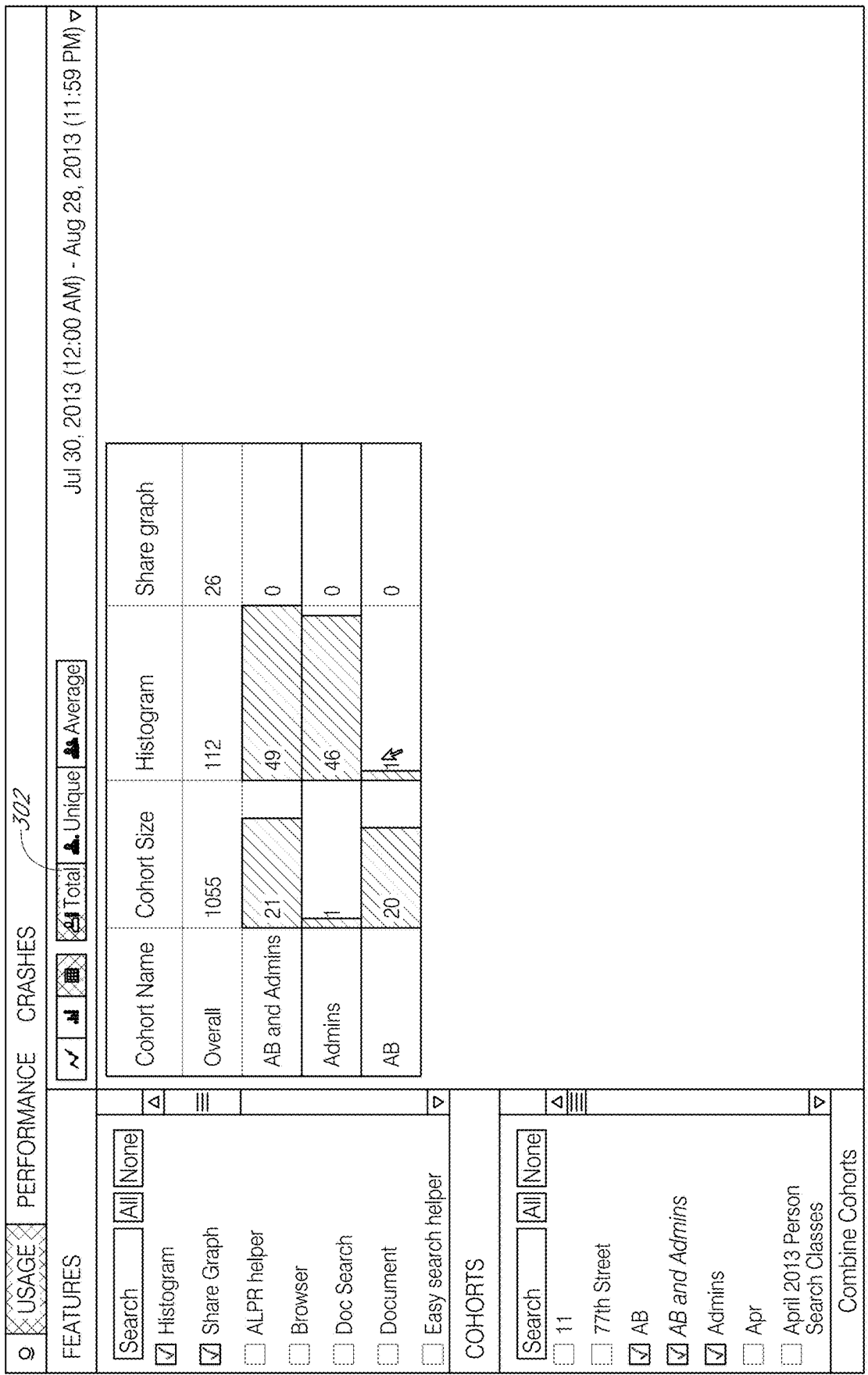
FIGS. 3A-3C illustrate additional sample user interfaces of the user interaction data analysis system in which usage data is presented in tables, according to embodiments of the present disclosure.
Figure 3B:
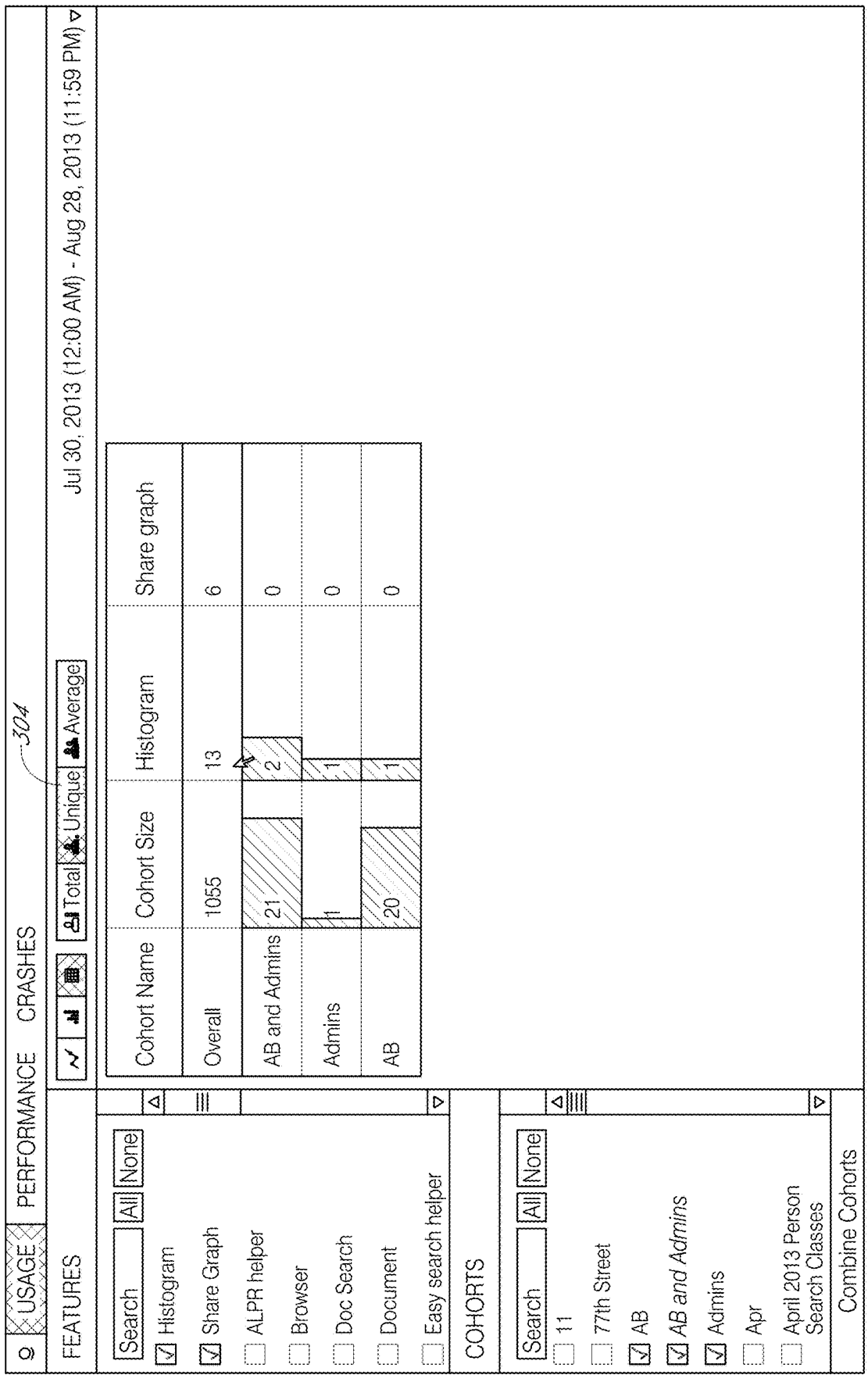
Figure 3C:
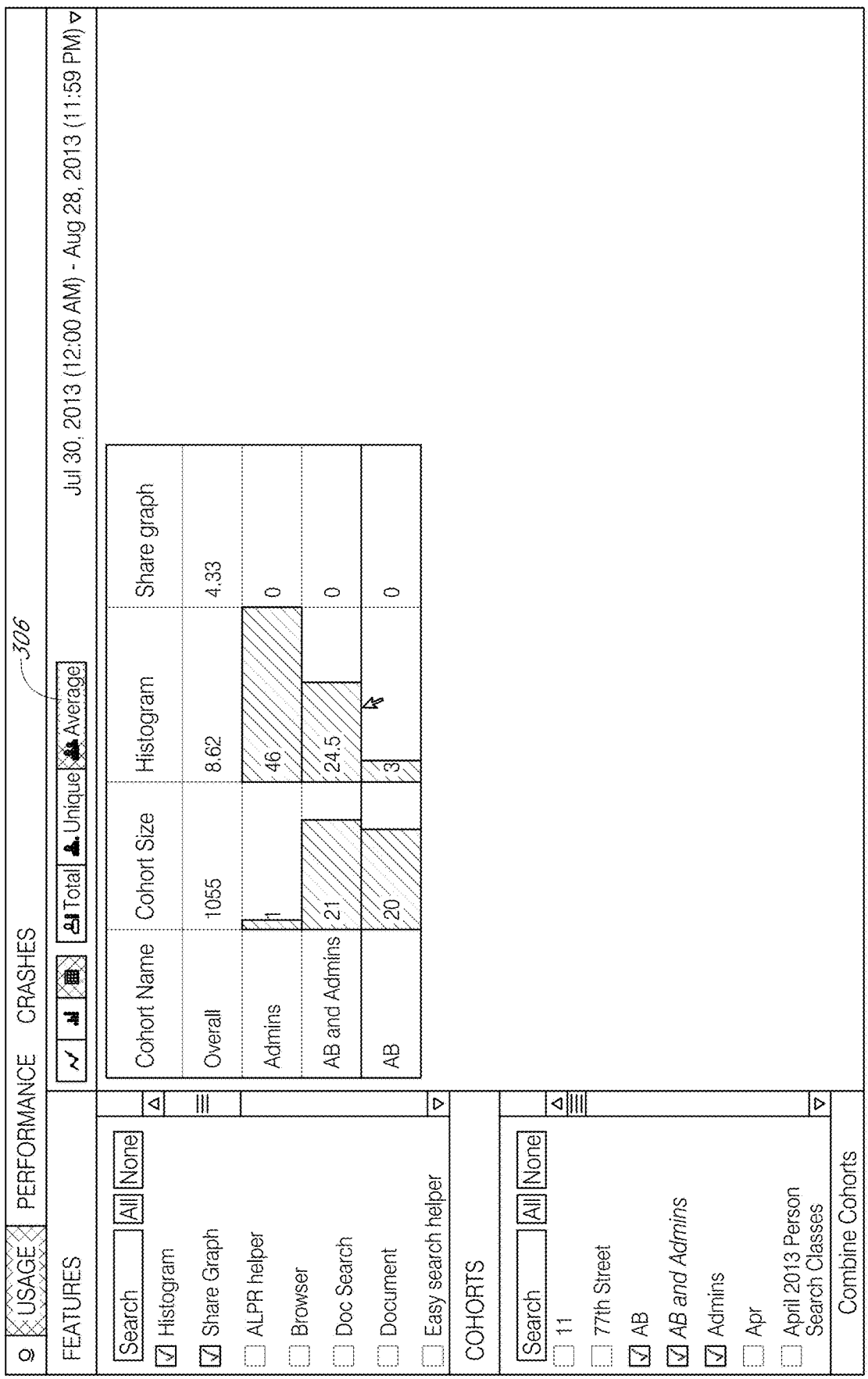

FIGS. 3A-3C illustrate additional sample user interfaces of the user interaction data analysis system in which usage data is presented in tables, according to embodiments of the present disclosure. FIG. 3A shows user interaction data in a table view in which a Total calculation button 302 is selected (similar to FIG. 1A described above). FIGS. 3B and 3C show user interaction data in table views in which Unique calculation button 304 and Average calculation button 306 are selected, respectively.

FIG. 3A shows total count metrics for three cohorts (AB and Admins, Admins, and AB) for two features (Histogram and Share Graph). As described above, the metrics displayed when the Total calculation button 302 is selected comprise a total number of user interactions, with a particular feature, for all users in a cohort, over the specified time period. FIG. 3B shows, for the same cohorts and features, unique count metrics when the Unique calculation button 304 is selected. When the Unique calculation button 304 is selected, each metric indicates a total number of unique users who interacted with the particular feature at least once in the specified time period. FIG. 3C shows, for the same cohorts and features, average count metrics when the Average calculation button 304 is selected. When the average calculation button 304 is selected, each metric indicates an average number of interactions, with a particular feature, for each user, over the specified time period. For example, average count metrics may be calculated by dividing the total count by the unique count, for each respective cohort and feature.

In various embodiments, other metric calculations may be displayed in the table view of the user interface.

Line Graph Visualization

Figure 4A:
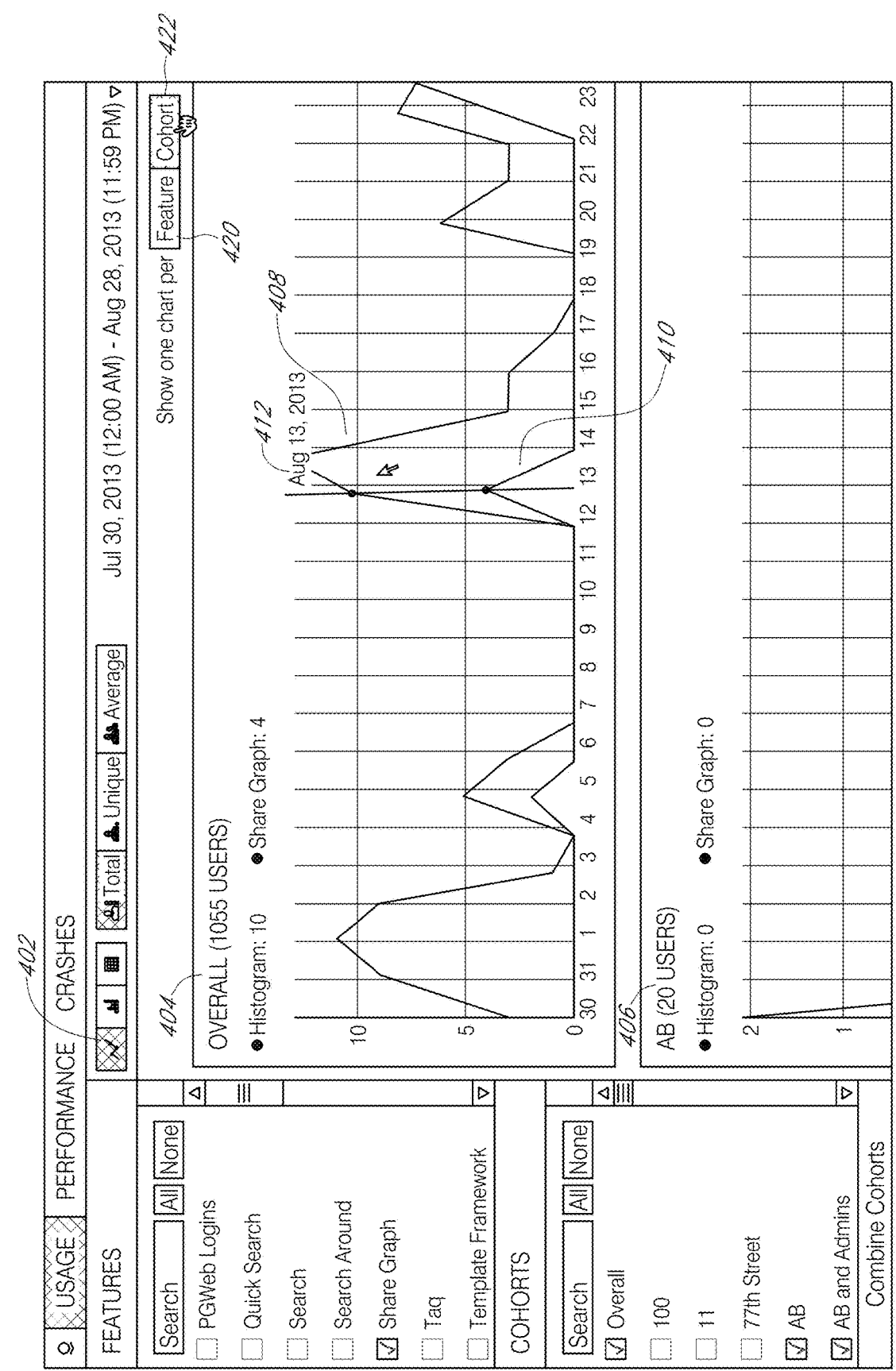
FIGS. 4A-4B illustrate additional sample user interfaces of the user interaction data analysis system in which usage data is presented in line graphs, according to embodiments of the present disclosure.
Figure 4B:
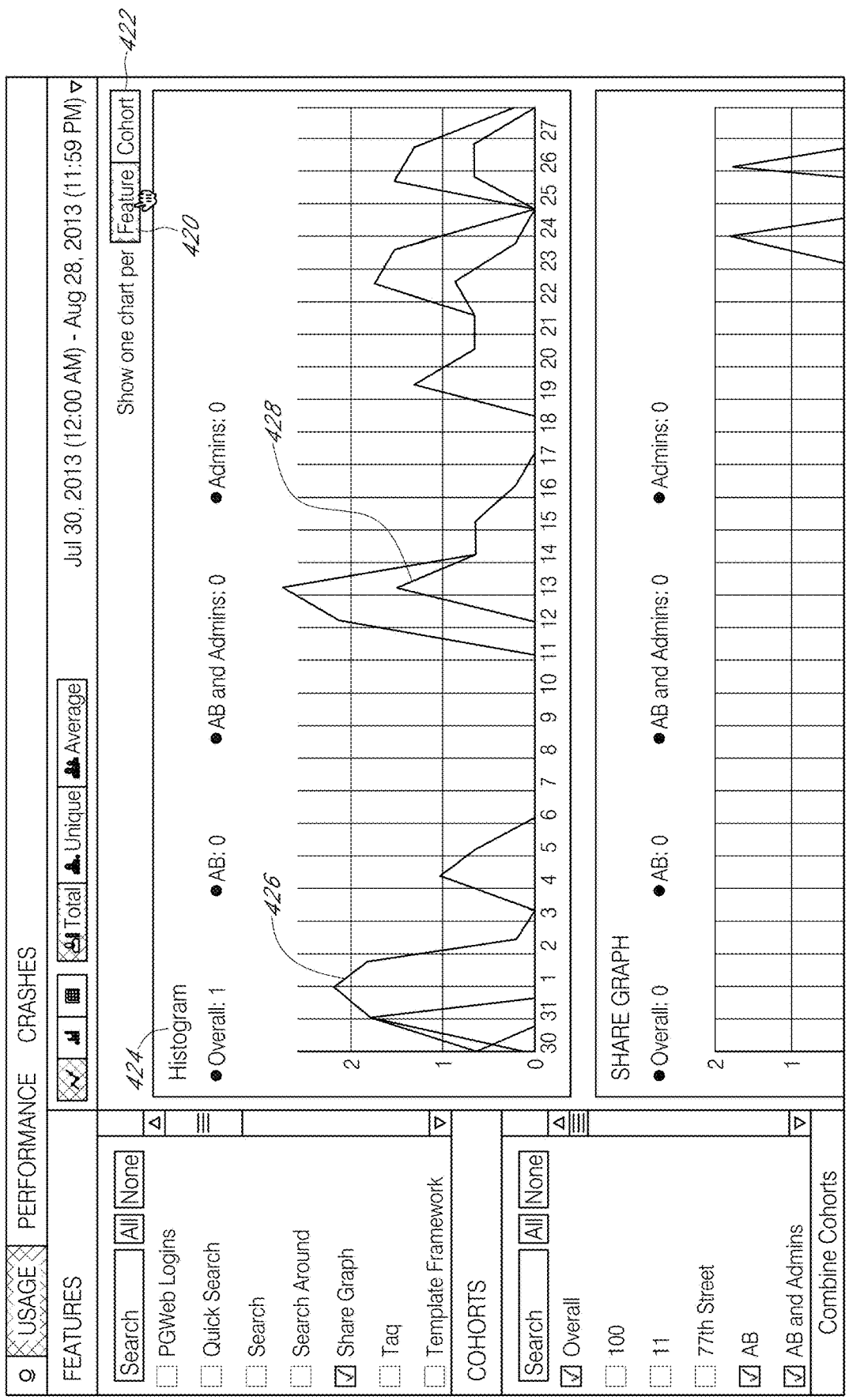

FIGS. 4A-4B illustrate additional sample user interfaces of the user interaction data analysis system in which usage data is presented in line graphs, according to embodiments of the present disclosure. FIG. 4A shows that the operator has selected the line graph selection button 402, which causes the system to generate a user interface that shows one or more line graphs such as line graph 404 and line graph 406. FIG. 4A also shows that the operator has selected the "Show one chart per: Cohort" button 422. Accordingly, the example user interface of FIG. 4A shows one line graph for each selected cohort. In this example, as shown in the cohorts sidebar, the selected cohorts include Overall, AB, and AB and Admin, and one line graph is generated for each selected cohort, including line graph 404 and line graph 406. The system operator may optionally scroll down the user interface to view the remainder of the line graph 406 (which is only partially visible in FIG. 4A), and line graphs corresponding to additional selected cohorts.

In FIG. 4A, each of the line graphs is comprised of user interaction data indicating cohort usage of the various selected features, over the currently select time period. For example, the line graph 404 shows usage data over time associated with users of the Overall cohort and each of the selected features, Histogram and Share Graph. Line 408 shows Histogram usage over time, while line 410 shows Share Graph usage over time. In an embodiment, the operator may hover a cursor or other input device over the line graph (or otherwise select aspects of the line graph) to view detailed information. For example, in FIG. 4A the operator has selected the date Aug. 13, 2013 (indicated by the popup date and line at 412), causing the system to display, in the line graph window 404, that on that date there were ten total interactions with the Histogram feature, and 4 total interactions with the Share Graph feature. As described previously with respect FIGS. 3A-3C, the operator may select any of the Total, Unique, or Average calculation buttons, which will cause the line graphs to be updated accordingly.

In an embodiment, the operator may select a "Show one chart per: Feature" button 420, which causes the user interface to be updated as shown in FIG. 4B. As shown in FIG. 4B, one line graph is now shown for each of the selected features: Histogram and Share Graph. On each line graph, for example line graph 424 (showing user interaction data related to the Histogram feature), lines are plotted showing the usage respective feature by the various selected cohorts. In the example of FIG. 4B, for example, line 426 indicates the usage by users in the Overall cohort, while line 428 indicated usage by users in the AB and Admins cohort. As with the user interface of FIG. 4A, and as described previously with respect FIGS. 3A-3C, the operator may select any of the Total, Unique, or Average calculation buttons, which will cause the line graphs to be updated accordingly.

Bar Graph Visualization

Figure 5A:
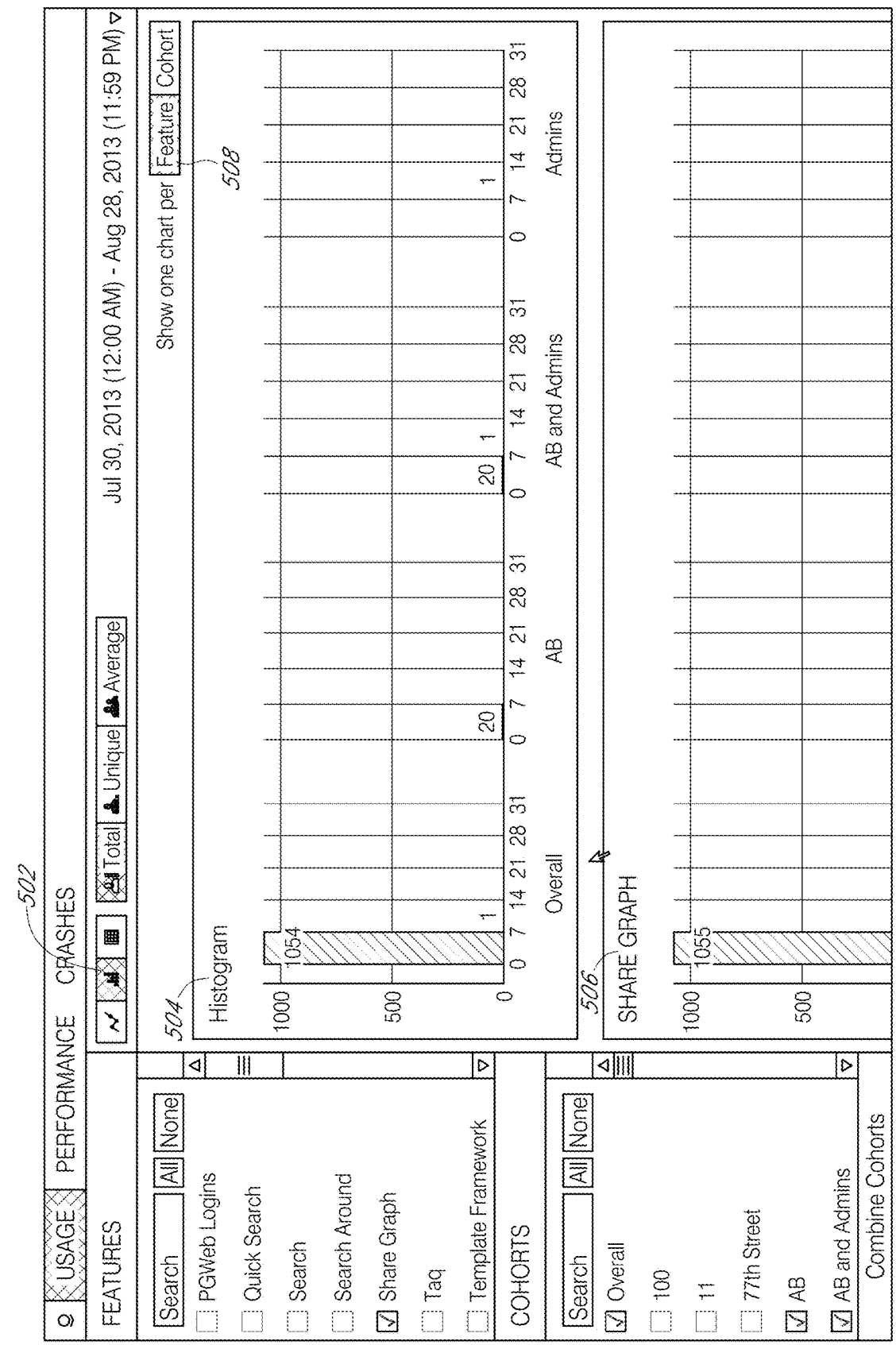
FIGS. 5A-5B illustrate additional sample user interfaces of the user interaction data analysis system in which usage data is presented in bar graphs, according to embodiments of the present disclosure.
Figure 5B:
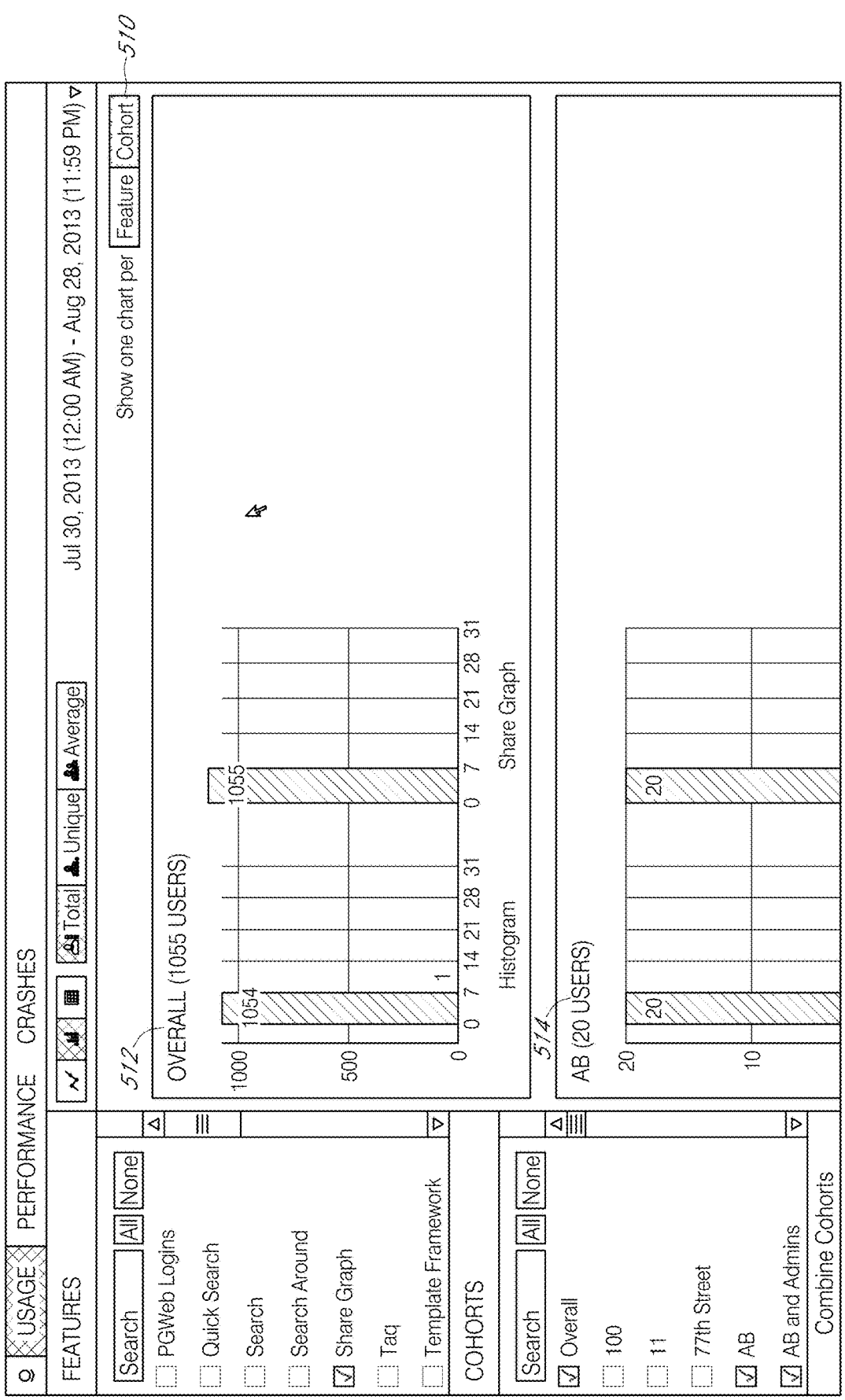

FIGS. 5A-5B illustrate additional sample user interfaces of the user interaction data analysis system in which usage data is presented in bar graphs, according to embodiments of the present disclosure. FIG. 5A shows that the operator has selected the bar graph selection button 502, which causes the system to generate a user interface that shows one or more sets of bar graphs such as bar graphs 504 and bar graphs 506. FIG. 4A also shows that the operator has selected the "Show one chart per: Feature" button 508. Accordingly, the example user interface of FIG. 5A shows one set of bar graphs for each selected feature. In this example, the selected features include Histogram and Share Graph, and one set of bar graphs is generated for each selected feature, including bar graphs 504 and bar graphs 506. The system operator may optionally scroll down the user interface to view the remainder of the bar graphs 506 (which is only partially visible in FIG. 5A), and bar graphs corresponding to additional selected features.

In FIG. 5A, each set of bar graphs is comprised of user interaction data indicating feature usage by each of the selected cohorts. For each selected cohort and each selected feature, a bar graph is generated that shows a distribution of usage of respective features by the users of each cohort, over the specified time period. For example, the Histogram bar graphs 504 includes a chart that shows a distribution of Histogram usage by users of the Overall cohort over the previous 30 days. The Histogram-Overall bar graph includes five bins including 0-7, 8-14, 15-21, 22-28, and 29-31. The system places each user of the cohort in a bin that corresponds to the number of days in the 30 day time period that the user has used the Histogram feature. Thus, the Histogram-Overall bar graph indicates to the operator that, of the 1055 users in the Overall cohort, 1054 used the Histogram feature for 0-7 days out of the last 30 days, and 1 used the Histogram feature for 8-14 days out of the last 30 days. Similarly, of users in the AB cohort, all 20 used the Histogram feature for 0-7 days out of the last 30 days.

In various embodiments, a longer or shorter time period may be specified by the operator of the system. In these embodiments, the system may automatically select more or fewer than 5 bins, and each bin may cover a longer or shorter time period than 7 days.

In an embodiment, the operator may select a "Show one chart per: Cohort" button 510, which causes the user interface to be updated as shown in FIG. 5B. As shown in FIG. 5B, a set of bar graphs may be generated for each of the selected cohorts: Overall (indicated by 512), AB (indicated by 514), AB and Admins, and Admins. Each set of bar graphs includes bar graphs corresponding to each selected feature. The bar graphs of FIG. 5B display user interaction data in a similar manner to that of the bar graphs of FIG. 5A.

Other Usage Views Details

In an embodiment, the usage view may display usage information related to types of data, or data sources, accessed by users of the software application(s). In this embodiment, particular data types and/or data sources may be listed as features, and usage may be tracked as with other types of features described above.

The various usage views and/or visualizations of the system enable an operator to determine, for example, for particular cohorts and/or particular features, the usage patterns associated with the software application(s). This usage information may be used to, for example, determine particular features of the software application(s) that are especially important or heavily used (or underused) by particular cohorts, and/or to determine cohorts or users that may need training related to particular features, among other advantages.

Performance Data Visualizations

FIGS. 6A-6E illustrate additional sample user interfaces of the user interaction data analysis system in which performance data is presented, according to embodiments of the present disclosure. FIG. 6A-6E show, for example, that the operator of the system has selected the Performance option 602 on the analysis selection bar. Selection of the Performance option 602 causes the system to access and display performance data from the user interaction data, and display various visualizations of the performance data that are usable by the operator to better understand user interactions with the one or more software applications. In each of FIGS. 6A-6E, the operator has selected to view performance data related to, among other features, Doc Search, Document, Geo Search, Histogram Load, and Share Graph.

In an embodiment, the system accesses the user interaction data to determine those features to list in the features sidebar when the various analysis modes of the system are selected by the operator. For example, when the operator selects the Usage analysis option, the system may access the user interaction data to determine a list of usage-related features from the usage data of the user interaction data. In another example, when the operator selects the Performance analysis option, the system may access the user interaction data to determine a list of performance-related features from the performance data of the user interaction data. The determined list of features may then be displayed in the features sidebar of the user interface of the system. In an embodiment, features listed in the features sidebar when the Performance option is selected are the same as those listed when the Usage option is selected. In another embodiment, features listed in the features sidebar when the Performance option is selected may not be the same as those listed when the Usage option is selected.

Each of FIGS. 6A-6C, and 6E list various cohorts in a cohorts sidebar that may be selected by the operator, similar to the lists in the cohorts sidebar as described above in reference to various figures (for example, FIG. 1A). FIG. 6D lists various users associated with a selected cohort in a users sidebar that may be selected by the operator, similar to the list in the users sidebar as described above in reference to FIG. 1C).

Similar to the tables of FIGS. 3A-3C described above, the performance data in each of FIGS. 6A-6E is displayed in tables in which various performance data is organized according to selected features and cohorts. The rows of the table correspond to the selected cohorts (or in the example of FIG. 6D, the rows correspond to users), while the columns of the table correspond to the selected features. Cells of the table indicate performance data associated with respective cohorts (or users) and features.

Each of FIGS. 6A-6E additionally include "Absolute" and "Relative" data display options (indicated by 604 of FIG. 6A) that are alternatively selectable by the operator, and "50th," "90th," "99th" percentile options (indicated by 606 of FIG. 6A) that are also alternatively selectable by the operator. Each of the data display options and percentile options may be selected by the operator of the system by, for example, clicking on or otherwise selecting the desired option through the user interface. Currently selected options are indicated in FIGS. 6A-6E by a shading or cross-hatching. In other embodiments, option selection may be indicated by, for example, a coloring, texture, or other differentiating characteristic. In an embodiment, other percentile option may be available to the operator, for example, 10th, 20th, 30th, 40th, 60th, 70th, 80th, or any other percentile.

In an embodiment, selection of the "Absolute" data display option causes performance data to be displayed that is aggregated across user interactions for a particular time period. Selection of the "Relative" data display option causes performance data to be displayed as a relative comparison of user interaction data for one time period to user interaction data for another time period. In an embodiment, selection of the various percentile options causes performance data to be displayed that indicates, for example, performance values (also referred to as measurements or numbers) below which a given percentage of performance data measurements in respective groups of measurements (for example, a group of measurements corresponding to a particular cohort's use of a particular feature, during a particular period of time) fall. For example, selection of "50th" percentile causes the system to display performance data that indicates 50th percentile, or median, performance values. In another example, selection of "90th" percentile causes the system to display performance data that indicates 90th percentile performance values. In an embodiment, higher percentiles may generally indicate worse performance values, as a higher percentile includes a larger range of performance values. Examples of performance values associated with percentile options are be described in detail in reference to FIGS. 6A-6E below.

Figure 6A:
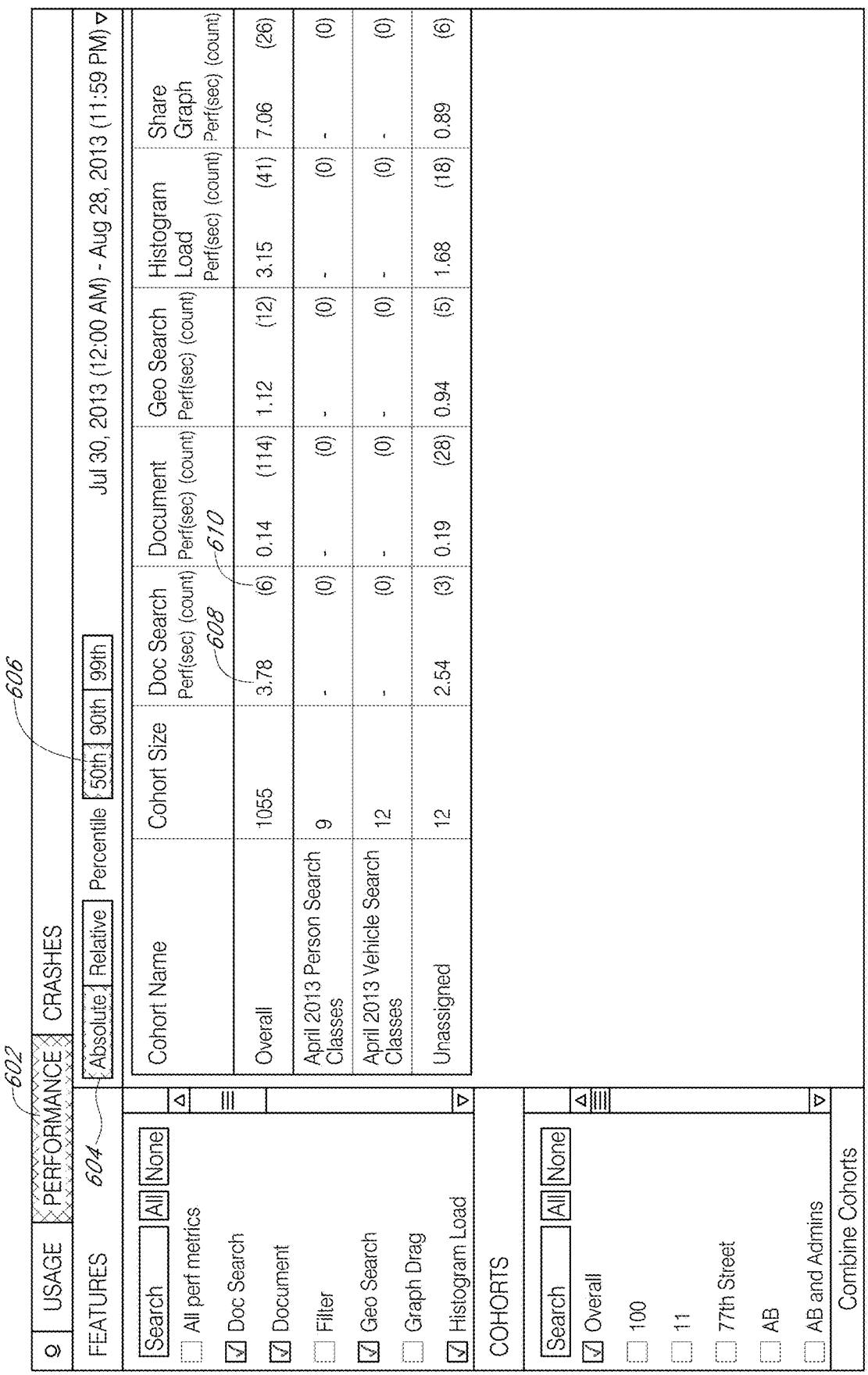

Referring now specifically to FIG. 6A, as indicated by 604 the operator has selected the "Absolute" performance data option and the "50th" percentile option. The table shows the performance data associated with the selected features and cohorts. For example, for the Overall cohort and the Doc Search feature, 608 indicates that the performance of the feature is 3.78 seconds (for example, the median performance of the Doc Search feature is 3.78 seconds). Additionally, 610 indicates that 6 actions, or user interactions, are being taken into account in determining the performance 50th percentile value. Similarly, for the Overall cohort, the median performance for the Document feature is 0.14 seconds, and 114 interactions are taken into account. In an embodiment, interactions taken into account for any particular performance value are determined based on the total number of user interactions associated with a particular specified time period, cohort, and feature.

Referring to FIG. 6B, as indicated by 620 the operator has changed the percentile option to "90th." As may be observed, the performance numbers displayed in the table are generally higher than were shown in FIG. 6A, as a 90th percentile of user interactions expectedly includes longer delays and/or worse performance associated with any particular feature than a 50th percentile of user interactions.

Referring to FIG. 6C, as indicated by 630 the operator has changed the percentile option to "99th." As may be observed, the performance numbers displayed in the table are generally higher than were shown in FIG. 6B, as a 99th percentile of user interactions expectedly includes longer delays and/or worse performance associated with any particular feature than a 90th percentile of user interactions.

Referring to FIG. 6D, as mentioned above, FIG. 6D shows a sample user interface in which the operator has selected a particular cohort (in this example, the Unassigned cohort) to view performance data associated with the various users contained in that cohort. As indicated by 643, a selectable list of users is displayed, and any selected users are displayed in the accompanying table 640 along with associated performance data. The operator may select the "Back to cohorts" button 642 to return to the table of cohorts (for example, any of FIGS. 6A-6C).

Figure 6E:
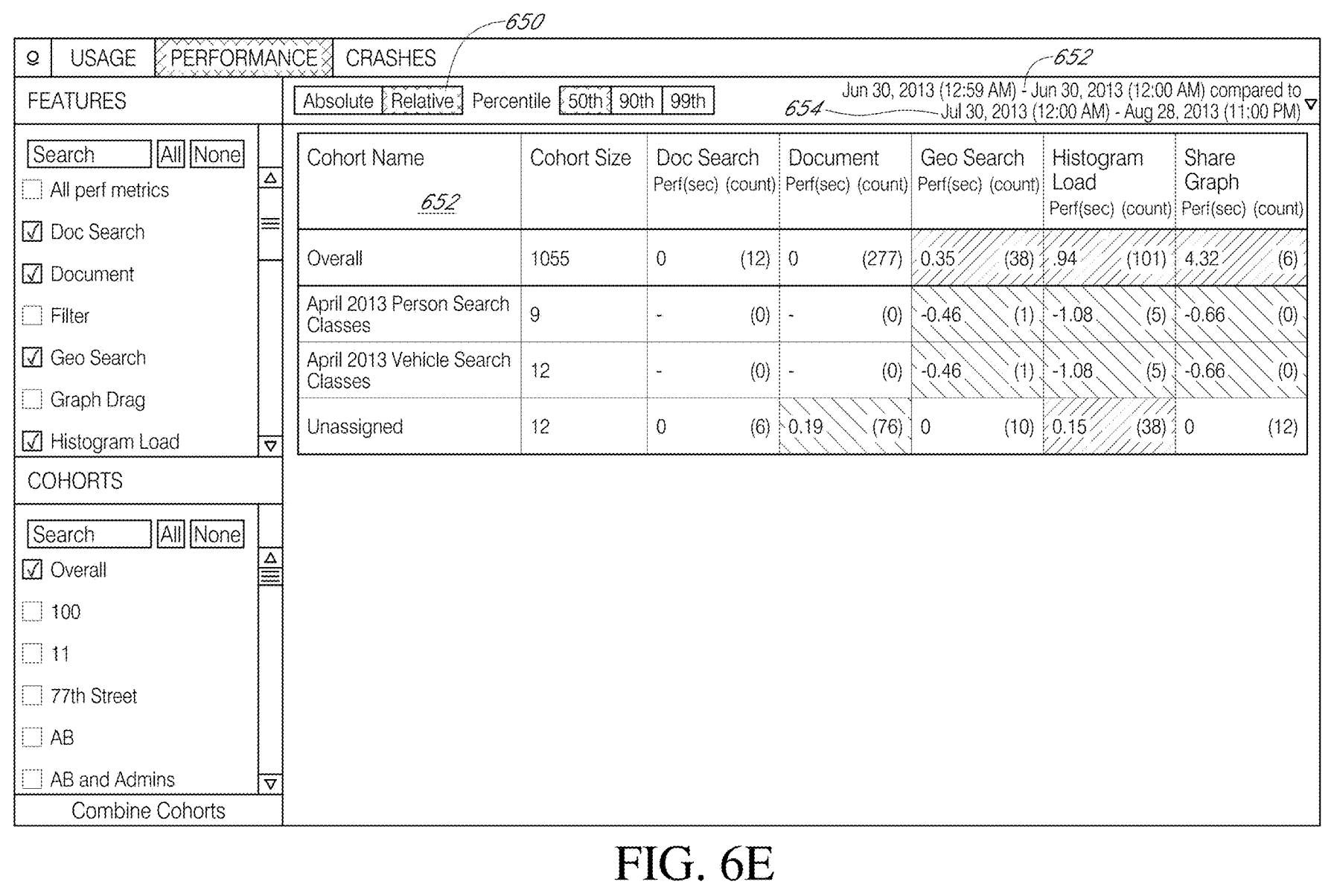

Referring to FIG. 6E, as indicated by 650, the operator has changed the data display option to "Relative." The operator may further specify a first time period (or timeframe) at 652, and a second time period (or timeframe) at 654. Performance data from the two selected time periods is then accessed and a comparison between the two is displayed in the table 652. For example, for the Overall cohort and the Geo Search feature, the shown 0.35 seconds value indicates that the 50th-percentile performance of the Geo Search feature was 0.35 seconds slower in the second time period as compared to the first time period. In another example, for the April 2013 Person Search Classes cohort and the Geo Search feature, the shown −0.46 seconds value indicates that the 50th-percentile performance of the Geo Search feature was 0.46 seconds faster in the second time period as compared to the first time period.

In an embodiment, the performance differences in the Relative display view may be indicated by a color, or other indicator. For example, improved performance may be indicated by green (or some other color) shading in the applicable cells, which degraded performance may be indicated by red (or some other color) shading in the applicable cells. In FIG. 6E, the cells showing degraded performance are indicated by one type of shading, while the cells showing improved performance are indicated by another type of shading.

The performance view of the system enables the operator to discover, for example, for particular cohorts and/or particular features, where performance of the software application(s) is poor, or needs improvement. The operator may then use this information to improve the software application(s), improve infrastructure underlying the software application(s), and/or assist or train users of the software application(s) so as to improve the performance of the software application(s), among other advantages.

Crashes Data Visualizations

FIG. 7 illustrates an additional sample user interface of the user interaction data analysis system in which crash data is presented, according to embodiments of the present disclosure. FIG. 7 shows that the operator has selected the crashes selection button 702, which causes the system to generate a user interface that shows a table 704 of crash data. The table 704 include three columns that display, for each crash event, an associated username (for example, an identifier associated with the user that was using the software application when a crash occurred), a cause of the crash event, and a date and time associated with the crash. The table 704 may be sorted by any of the three columns. Further, the operator may select a time period for which crash data is to be displayed. In an embodiment, the cause column may indicate the particular software application and/or feature associated with the crash.

The performance view of the system enables the operator to discover, for example, for particular user and/or particular features, when crashes occur. The operator may then use this information to detect problems with the software application(s), correct problems with the software application(s), and/or assist users of the software application(s) that have experienced a crash, so as to improve user experience with the software application(s), among other advantages.

User Interaction Data Filtering

FIGS. 8A-8I illustrate additional sample user interfaces of the user interaction data analysis system in which user interaction data is filtered, according to embodiments of the present disclosure. Beginning with FIG. 8A, as indicated by indicator 802, the operator has selected a Filter option of the user interface. In response, the user interface displays, at indicator 804, a list of filters applied and the number users meeting the filter criteria (in FIG. 8A, no filters have been applied, so all users with related user interaction data for the time period selected, 438, meet the criteria); at indicator 806, a selectable list of cohorts that include users that meet the applied filter criteria (in FIG. 8A, no filters have been applied, so all cohorts are listed; selected cohorts are indicated in bold, although in other embodiments other visual differentiation may be implemented); at indicator 808, a particular selected feature of interest (in FIG. 8A, the selected feature is Graph); and at indicator 810, a cohort-based visualization of usage data associated with the users meeting the applied filter criteria (in FIG. 8A, the displayed visualization is a cohort-based graph showing total usage of the Graph feature by all users, for each of the selected cohorts from the cohort list 806; in other embodiments other types of visualizations may be displayed).

Figure 8A:
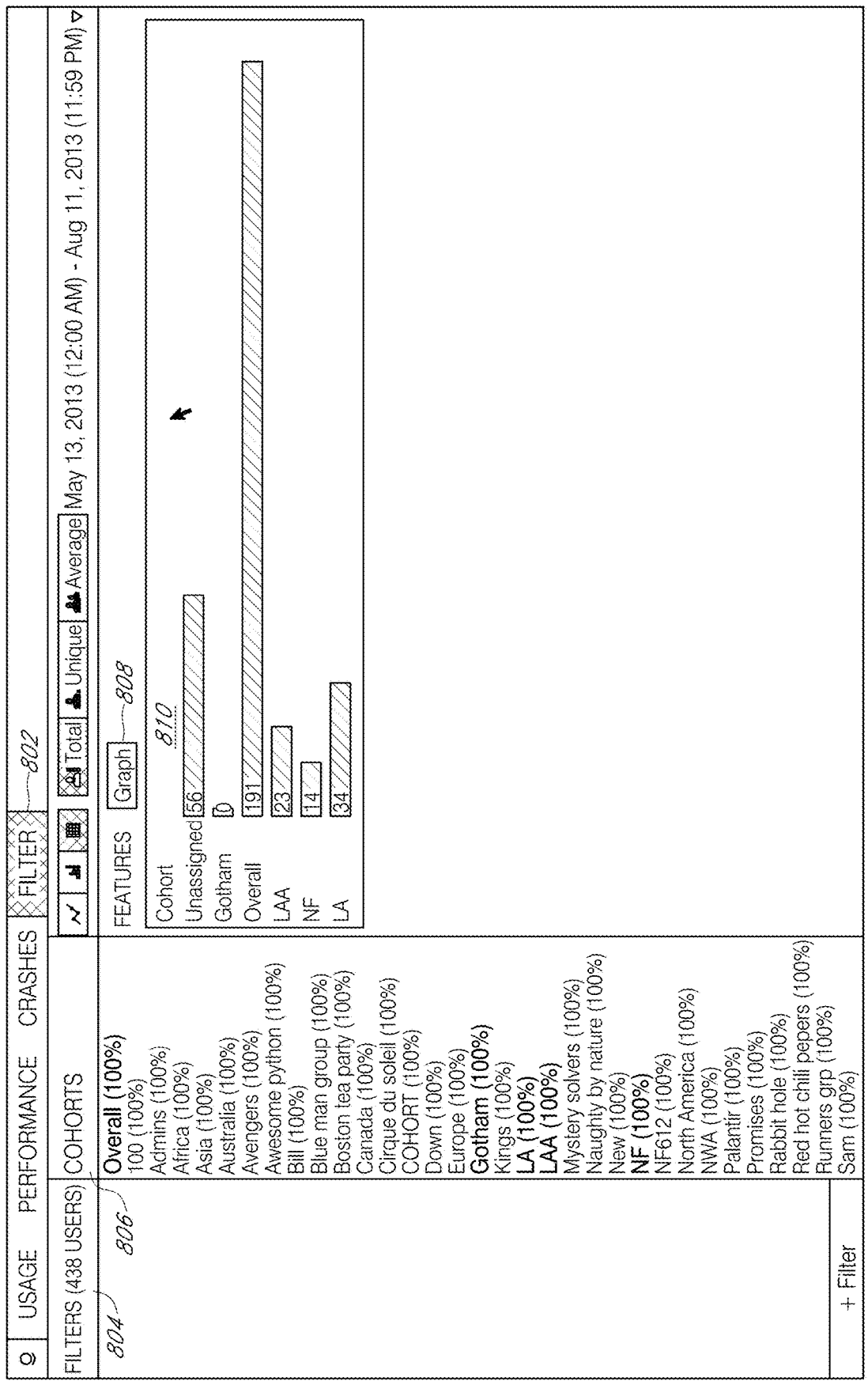
FIGS. 8A-8I illustrate additional sample user interfaces of the user interaction data analysis system in which user interaction data is filtered, according to embodiments of the present disclosure.
Figure 8B:
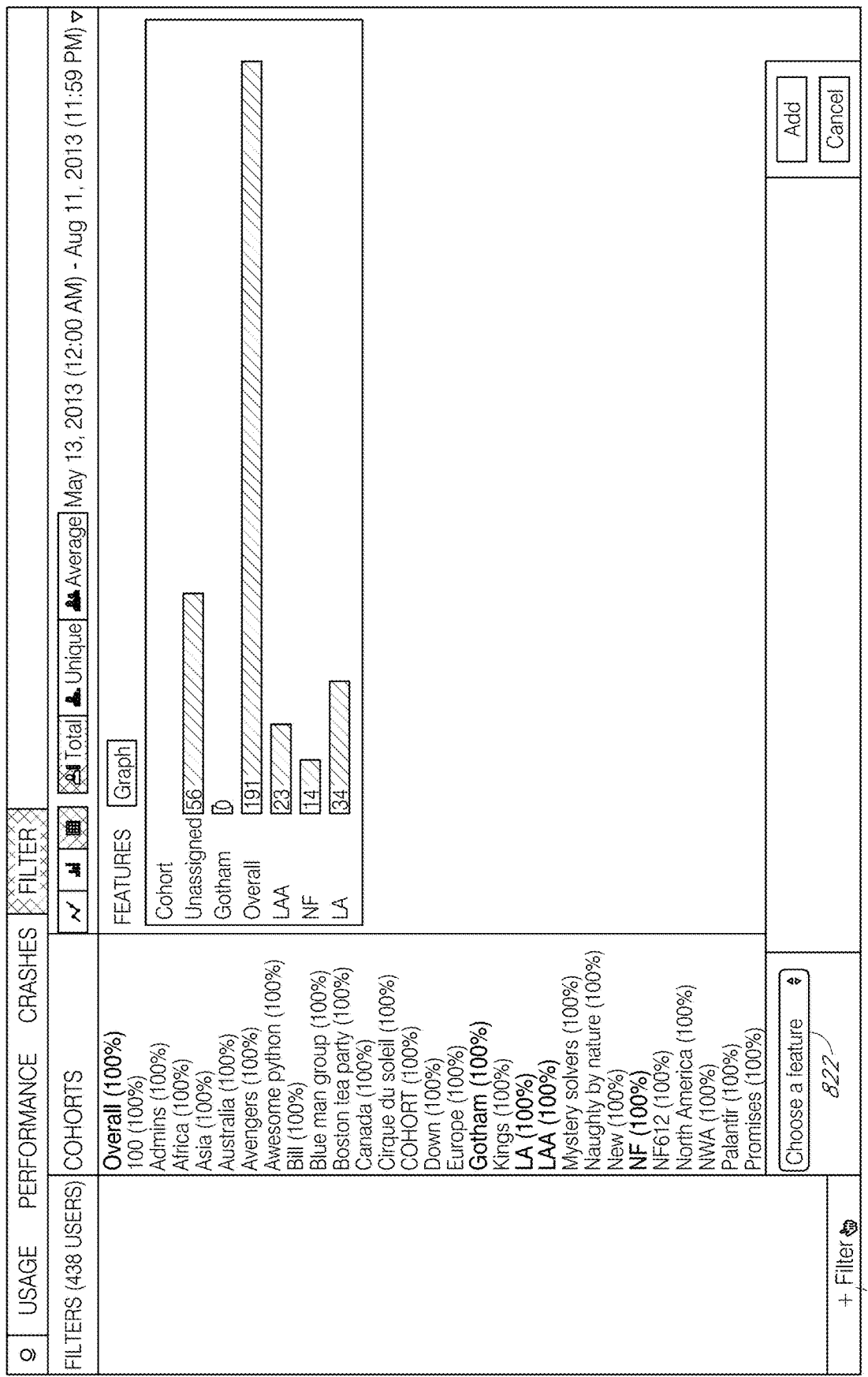
Figure 8C:
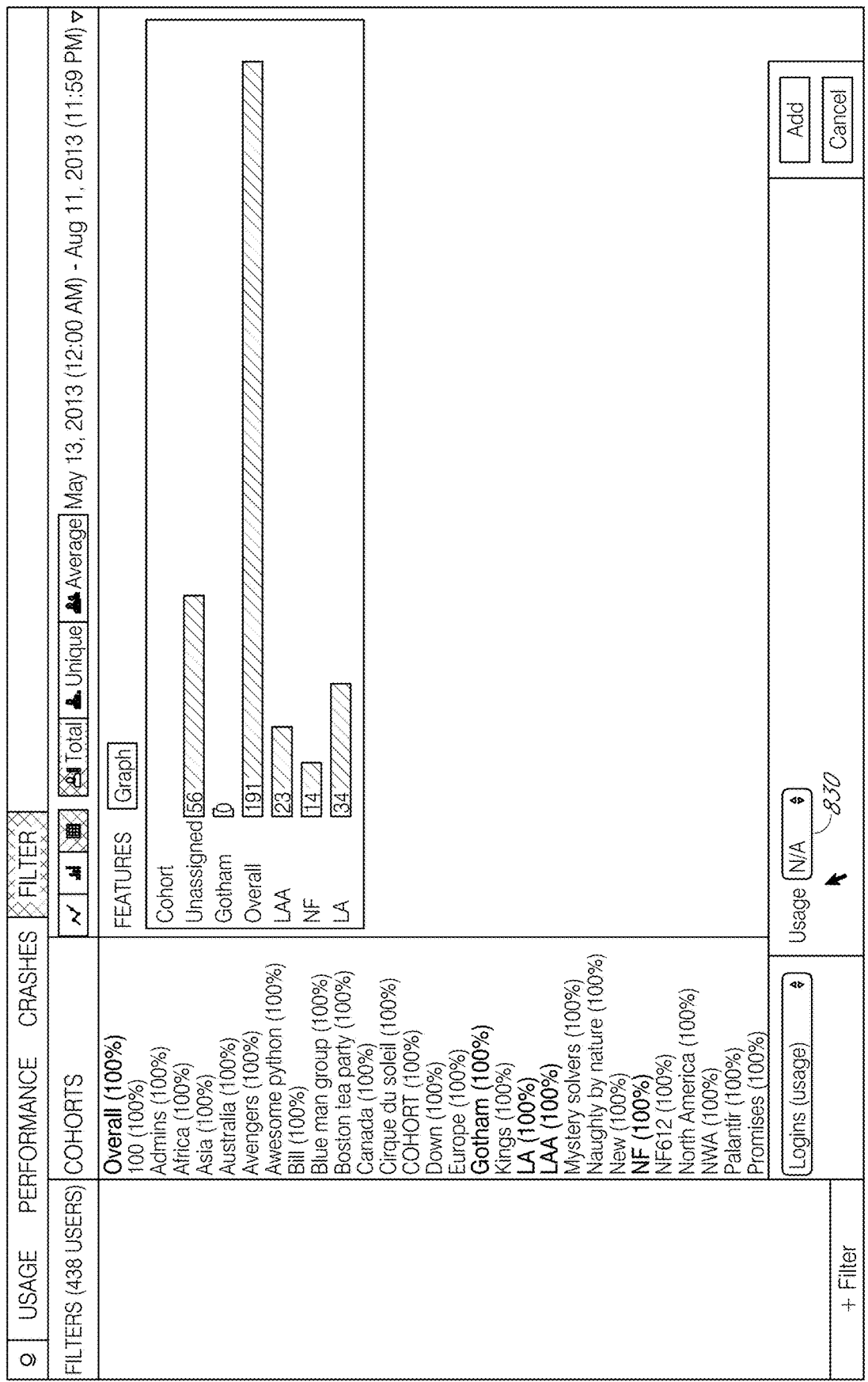
Figure 8D:
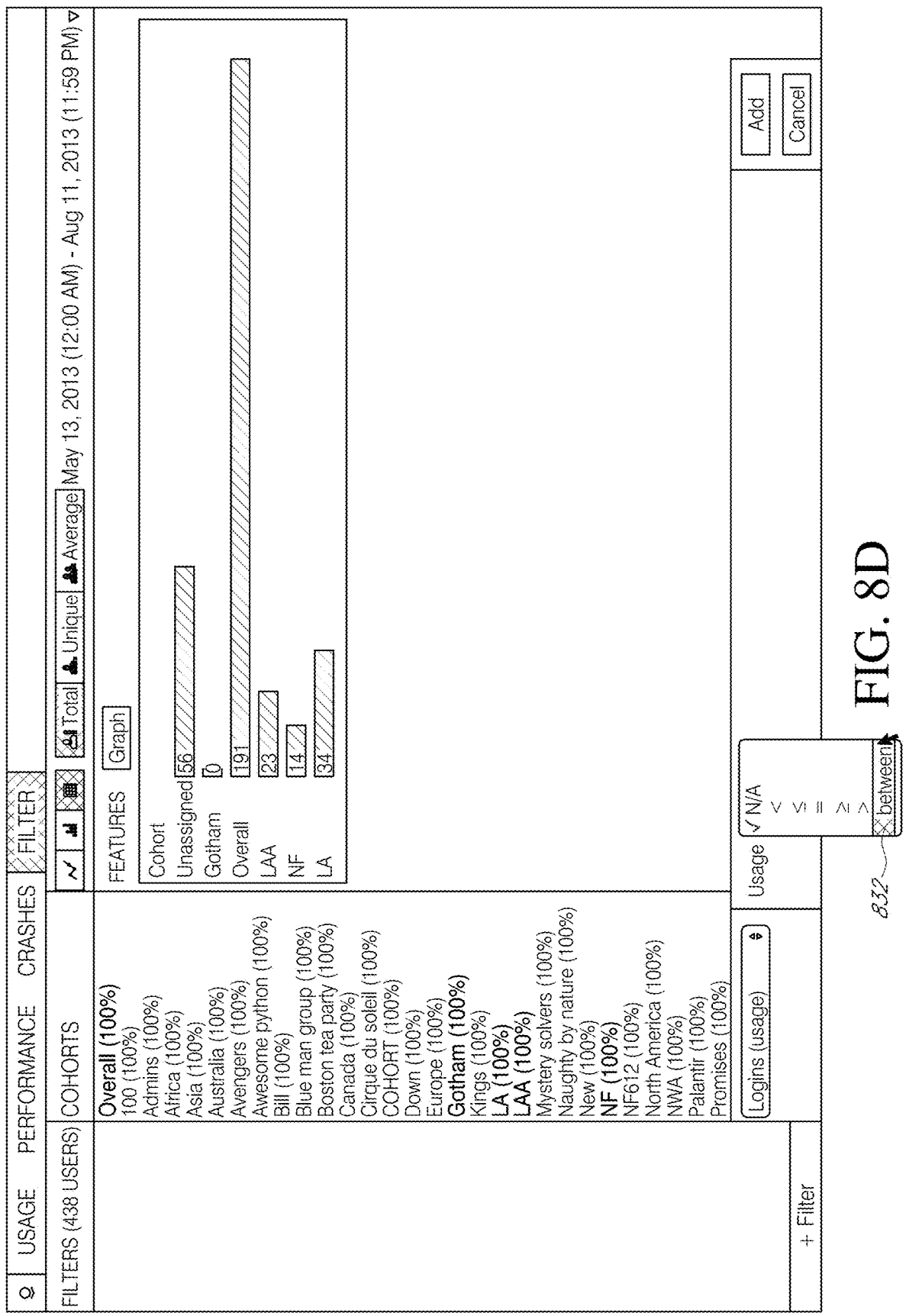
Figure 8E:
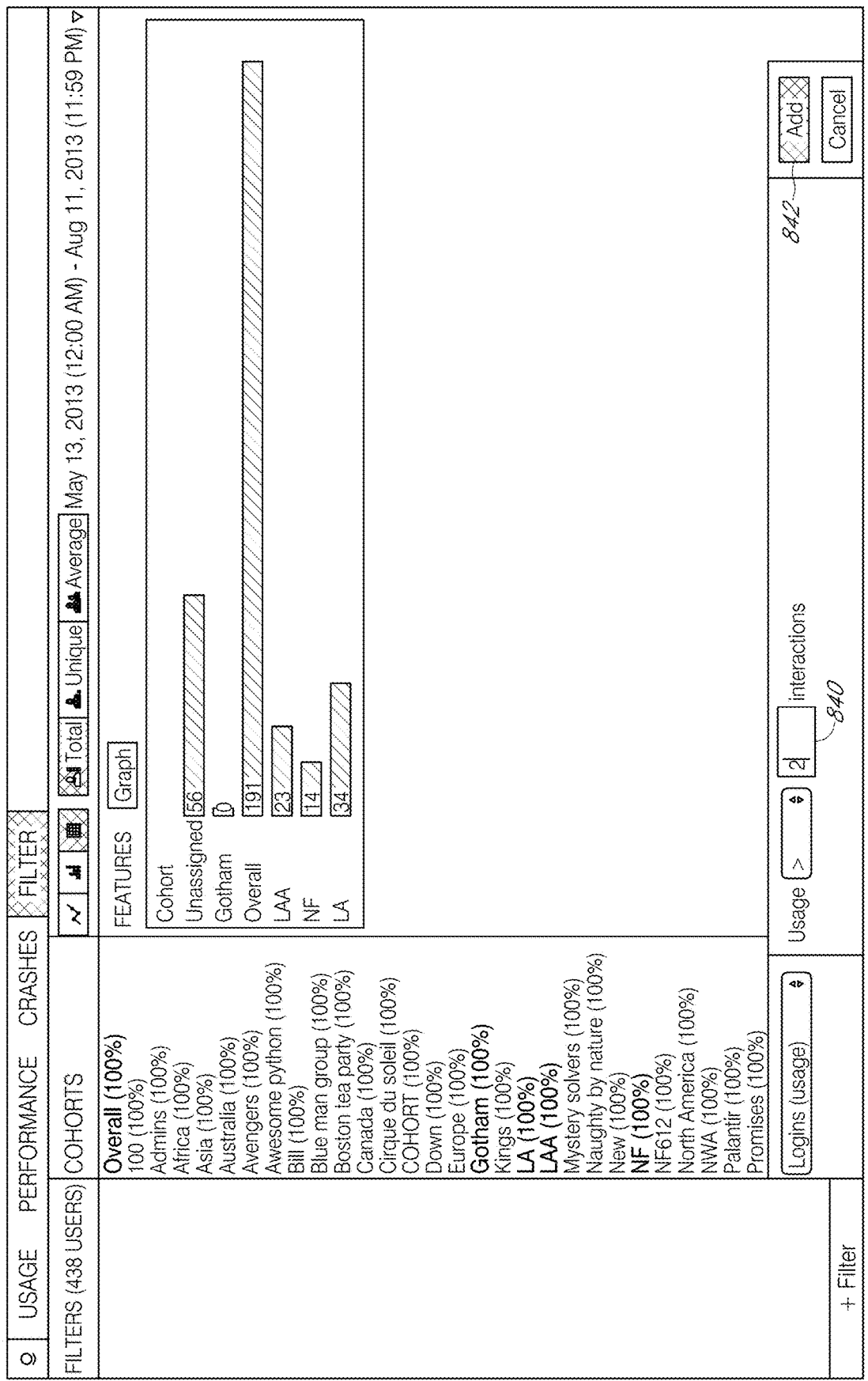

The operator may apply a filer to the user interaction data, as shown in FIG. 8B, by selecting a "Filter" button 820. Following selection of the filter button 820, the operator may select a particular feature upon which to filter from the dropdown 822. The dropdown 822 may include a list of all features for which user interaction data is available. As shown in FIG. 8C, after the operator has selected a feature (in this example, the operator has selected the feature Logins (usage), indicating usage data related to the Logins feature is being used as a basis of the filtering) the user may select dropdown 830 to select, as shown in FIG. 8C, a comparison operator to be associated with the selected feature. As shown in FIG. 8E, the operator may then select a number of interactions as 840 so as to complete the filter, and may then select the add button 842 to apply the filter to the user interaction data.

Figure 8F:
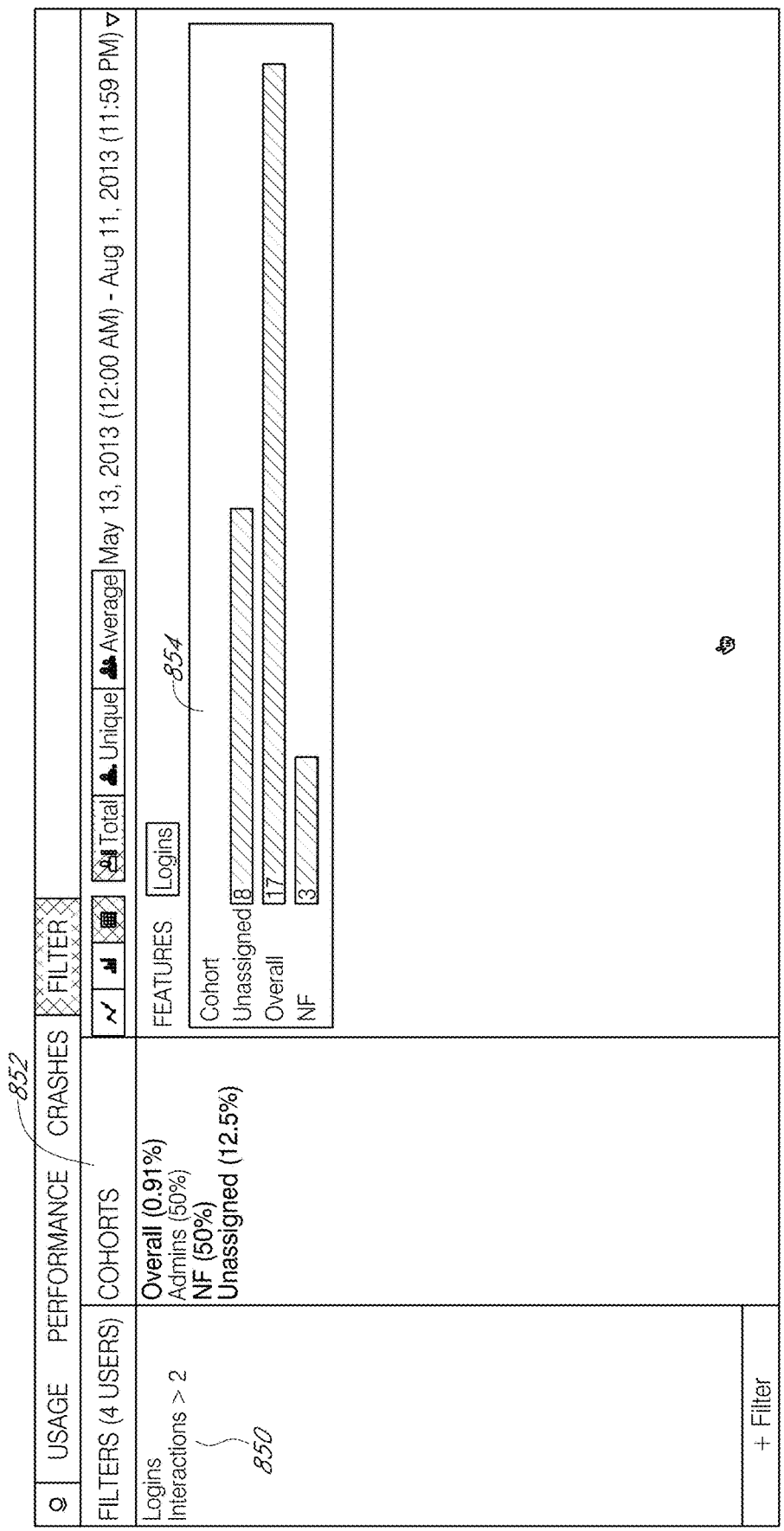

As shown in FIG. 8F at indicator 850, the filter has been applied to the user interaction data. In the example of FIG. 8F, only 4 users are shown to have greater than two interactions with the Login feature. The cohort list 852 lists all cohorts having at least one associated user that meets the applied filter criteria. Three of those four cohorts are selected by the operator (Overall, NF, and Unassigned), and a corresponding visualization is displayed at 854. Additionally, the each of the cohort listed in the cohorts list 852 includes information indicating the percent of the total users in the cohort meeting the filter criteria (for example, 0.91% of users in the Overall cohort have has more than 2 interactions with the Logins feature).

Figure 8G:
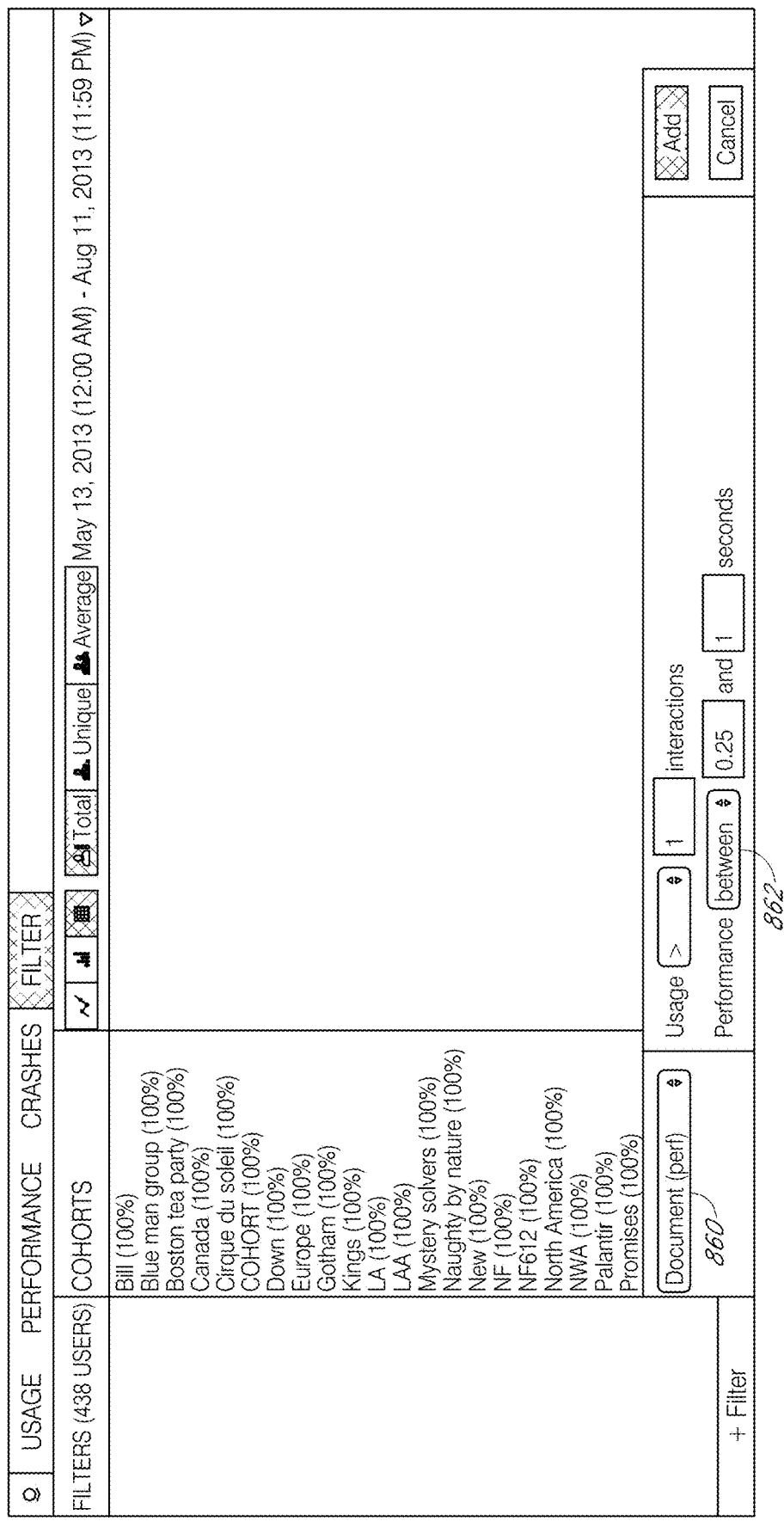
Figure 8H:
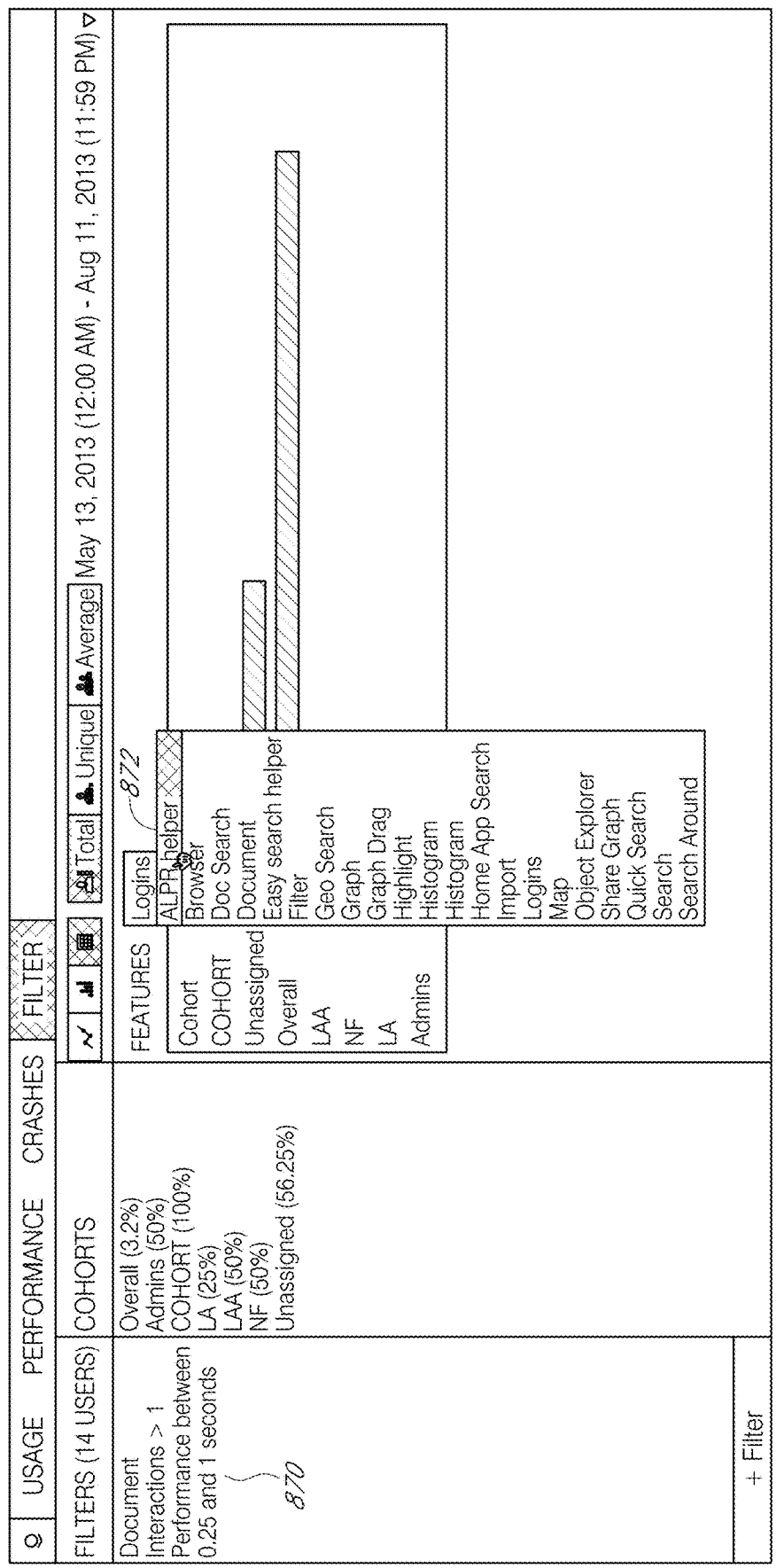
Figure 8I:
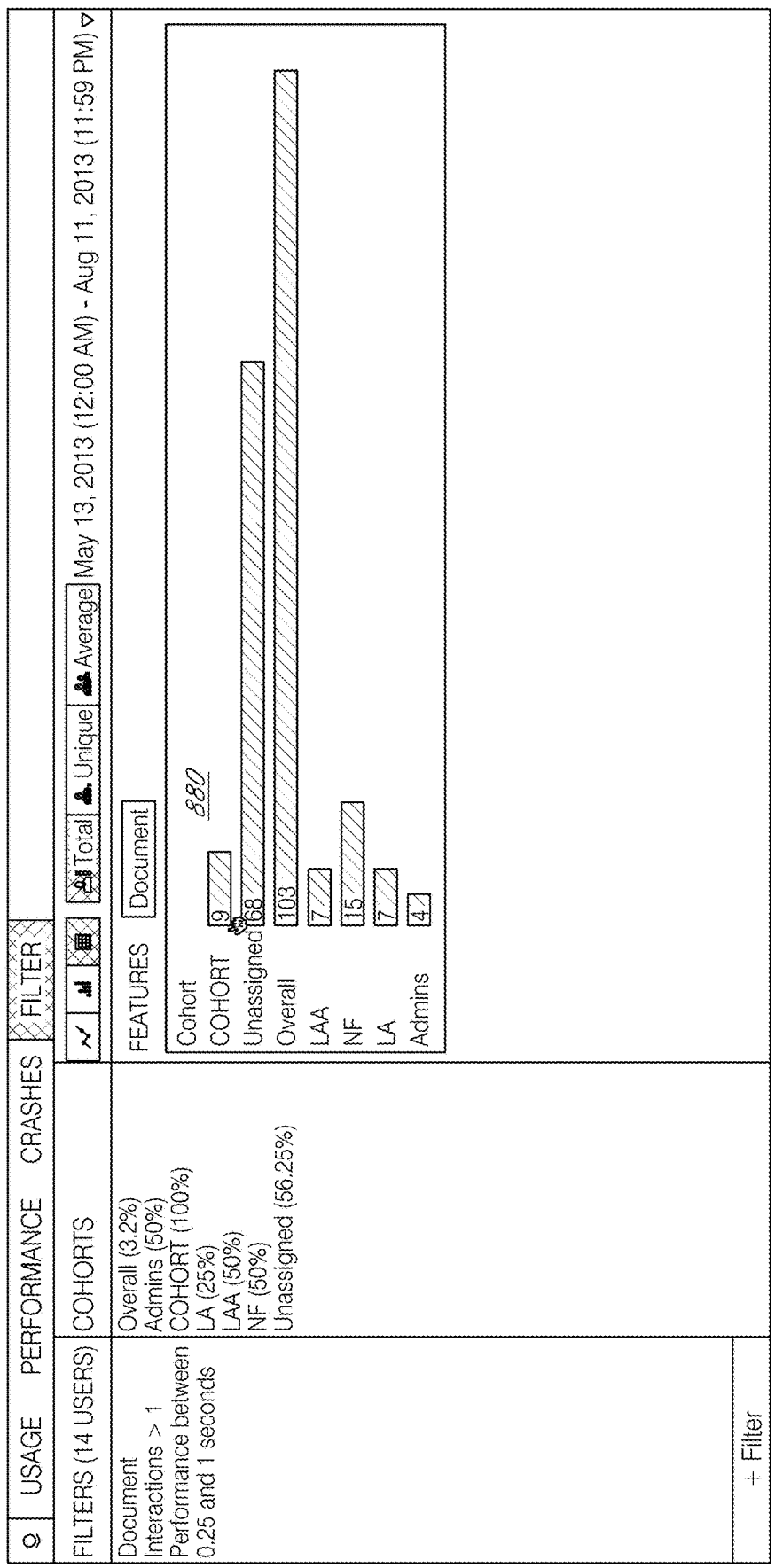

In another example, as shown in FIG. 8G, the operator may apply a filter based on performance data associated with a feature. In the example shown, the operator has selected Document performance data, and has specified the criteria to include only users have greater than one interaction with the Document feature, and experiencing performance between 0.25 and 1 seconds with respect to the Document feature. FIG. 8H shows, at indicator 870, the filter of FIG. 8G applied to the user interaction data. Additionally, the operator may select a different feature from the dropdown 872 to be the basis of the displayed visualization. For example, the operator may choose to display a visualization showing usage of the Browser feature by all users meeting the applied criteria. FIG. 8I shows cohort-based usage of the Document feature by users that meet the applied criteria.

Other Aspects of the Various Views

In various embodiments, one or more of the usage, performance, crashes, and/or filter views of the system may include other types of charts, tables, line graphs, bar graphs, animations, or other types of visualizations of user interaction data.

In various embodiments, the system may include popups, pop overs, and/or tool tips that comprise, for example, a window or display of information associated with selected and/or hovered over elements of the user interface. For example, a popup may automatically display when the operator hovers a cursor over a cohort in the cohorts list and/or in a visualization. The popup may display relevant to the cohort, for example, a number of users in the cohort, a cohort creation time, and/or other information related to the cohort.

In an embodiment, the users, cohorts, and/or features displayed in the user interface of the user interaction data analysis system are determined based on one or more automatically created or user-defined files. For example, an automatically created or user-defined file may comprise a comma-separated values-type file, and a user may manually define, in the file, lists of features, lists of users, and/or lists to cohorts. A file defining cohorts may include, for example, a list of cohorts, and for each cohort, a list of users to be associated with the cohort. The files may be accessed and read by the system when the user interface is generated, for example.

Sample Operations

Figure 9:
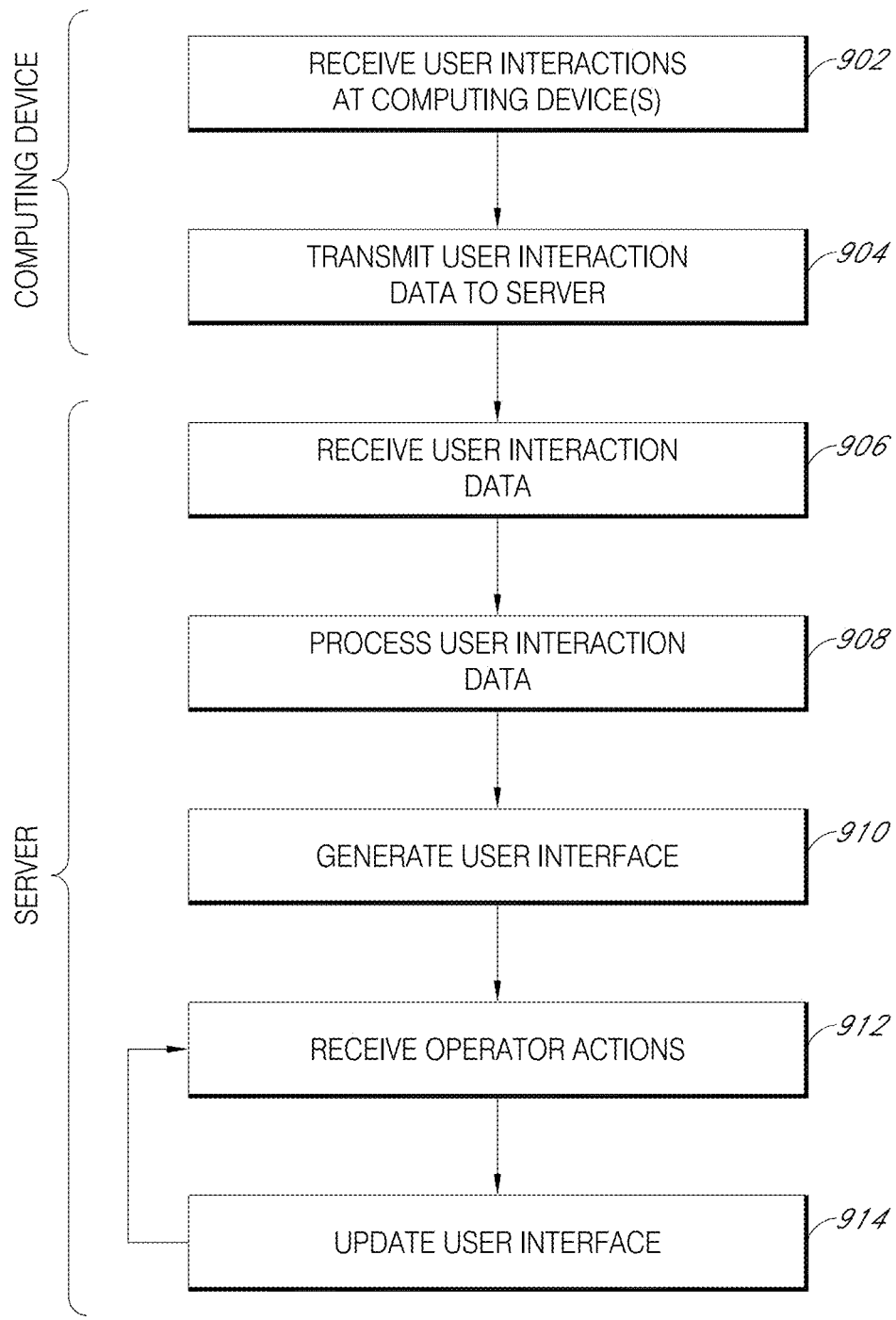
FIG. 9 shows a flowchart depicting illustrative operations of the user interaction data analysis system, according to an embodiment of the present disclosure.

FIG. 9 shows a flowchart depicting illustrative operations and/or processes of the user interaction data analysis system, according to an embodiment of the present disclosure. In various embodiments, fewer blocks or additional blocks may be included in the processes, or various blocks may be performed in an order different from that shown in FIG. 9. In an embodiment, one or more blocks in FIG. 9 may be performed by, or implemented in, one or more computer modules and/or processors, as is described below with reference to FIGS. 10A-10B.

As shown in FIG. 9, in an embodiment blocks 902-904 may be performed by and/or occur at one or more computing devices with which users interact. Blocks 906-914, on the other hand, may be performed by and/or occur at a computer server of the system. These various aspects of the user interaction data analysis system are further described below in reference to FIGS. 10A-10B.

At block 902, user interactions with one or more software applications are received at one or more computing devices. For example, user interactions with, for example, a data analysis application, a map application, a word processing application, or some other type of application may be tracked and/or stored. At block 904, the user interaction data is communicated to a server of the system.

At block 906, the user interaction data is received at the server. The data is then processed by the server at block 908. For example, the user interaction data may be organized by software application, by time, by user, by feature, by data type (for example, usage, performance, and/or crash data) and/or by any other useful index. Further, metrics may be processed and/or analyzed, and/or cohorts of users may be determined (automatically and/or in response to inputs by an operator). At block 910, a user interface is generated that displays the processed user interaction data, as described with reference to the figures above. For example, features and cohorts are listed, and visualization of selected cohorts and features are displayed on the user interface.

At block 912, the operator may interact with the user interface of the system in any of the ways described above. These actions are received by the system, and at block 914, the user interface is updated in response to the operator's actions. For example, the operator may select Usage, Performance, Crashes, or Filters view, causing the system to display information associated with those views. In another example, the operator may select and/or deselect one or more cohorts and/or features, causing the system to update the displayed visualizations.

In various embodiments, user interaction data may be received and processed by the system at any time and/or continuously. In an embodiment, user interaction data may be updated even as the operator is viewing the data on the user interface. For example, in an embodiment, the operator may use the system to analyze substantially real-time user interaction data.

As mentioned above, the user interaction data analysis system is advantageously configured to provide analysis and visualizations of user interaction data to a system operator (or one or more operators). In various embodiments, interactive visualizations and analyses provided by the system may be based on user interaction data aggregated across cohorts, across particular time frames, and/or from particular software and/or computer-based applications. According to various embodiments, the system may enable insights into, for example, user interaction patterns, the frequency of software application features accessed, the performance of various aspects of software applications, crashes of software applications, among others. In various embodiments, the system allows an operator to analyze and investigate user interactions data on a user-by-user basis or a group-by-group (or cohort-by-cohort) basis. The operator may then use the insights to improve user interactions with the software application(s) and/or to improve the software application(s), among other advantages.

Implementation Mechanisms

Figure 10A:
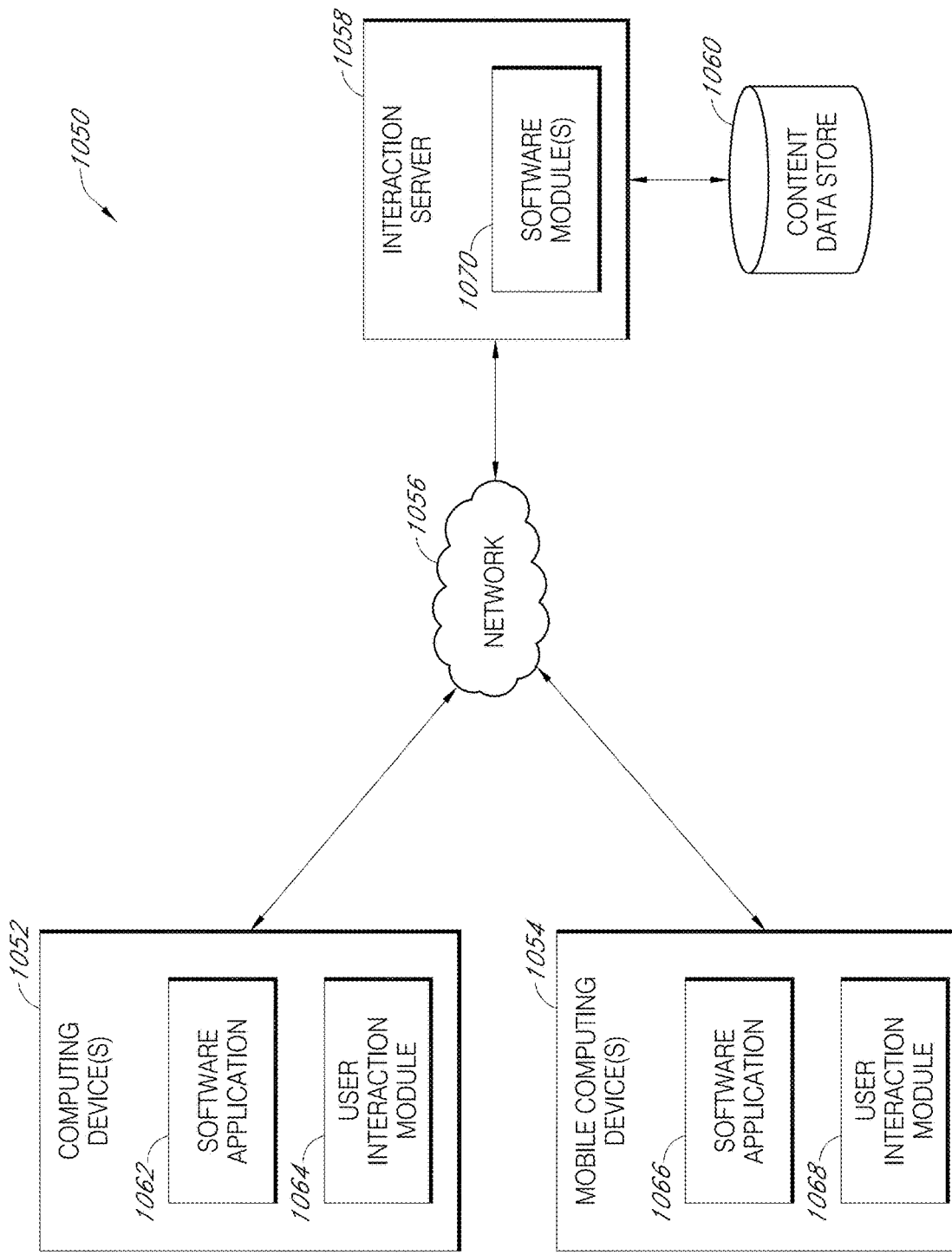
FIGS. 10A-10B illustrate a network environment and computer systems and devices with which various methods and systems discussed herein may be implemented.

FIG. 10A illustrates a network environment in which the user interaction data analysis system may operate, according to embodiments of the present disclosure. The network environment 1050 may include one or more computing devices 1052, one or more mobile computing devices 1054, a network 1056, an interaction server 1058, and a content data store 1060. The constituents of the network environment 1050 may be in communication with each other either locally or over the network 1056.

In an embodiment, the computing device(s) 1052 and/or the mobile computing device(s) 1054 may be any computing devices capable of displaying software applications to a user and receiving input from the user. For example, the computing device(s) 1052 and/or the mobile computing device(s) 1054 may include one or more of the types of computer-enabled devices mentioned above, such as smartphones, tablets, laptops, and/or other types of computing devices. The computing device(s) 1052 and/or the mobile computing device(s) 1054 may also be capable of communicating over the network 1056, for example, to request media, content, and/or application data from, and/or to provide user interaction data to, the interaction server 1058.

In some embodiments, the computing device(s) 1052 and/or the mobile computing device(s) 1054 may include non-transitory computer-readable medium storage for storing content information, app data, and/or collected user interaction data. For example, either of the computing device(s) 1052 and/or the mobile computing device(s) 1054 may include one or more software modules that may implement aspects of the functionality of the user interaction data analysis system. These may include, for example, software application 1062 and/or user interaction module 1064. The software application 1062 may be configured to present content to a user and receive interactions from the user. For example, the software application 1062 may comprise a web app, smartphone app, and/or tablet app, among others. The user interaction module 1064 may be configured to gather user interaction data as the user interacts with the software application, and to communicate the user interaction data to the interaction server 1058 for processing and display in the system user interface. Additional aspects, operations, and/or functionality of computing device(s) 1052 and/or the mobile computing device(s) 1054 are described in further detail in reference to FIG. 10B below.

The network 1056 may be any wired network, wireless network, or combination thereof. In addition, the network 1056 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The interaction server 1058 is a computing device, similar to the computing devices described above, that may perform a variety of tasks to implement the operations of the user interaction data analysis system. The interaction server may include one or more software modules 1070 that may be configured to, for example, receive user interaction data, process user interaction data, display the user interface (including various of the visualizations described above), receive inputs from the operator, and/or update the user interface. The user interaction data may be received from the computing device(s) 1052 and/or the mobile computing device(s) 1054 over the network 1056. Additional aspects, operations, and/or functionality of interaction server 1058 are described in further detail in referenced to FIG. 10B below.

The interaction server 1058 may be in communication with the content data store 1060. The content data store 1060 may store, for example, received and/or processed user interaction data, among other data. The content data store 1060 may be embodied in hard disk drives, solid state memories, and/or any other type of non-transitory, computer-readable storage medium remotely or locally accessible to the interaction server 1058. The content data store 1060 may also be distributed or partitioned across multiple storage devices as is known in the art without departing from the spirit and scope of the present disclosure.

In various embodiments, the system may be accessible by the operator through a web-based viewer, such as a web browser. In this embodiment, the user interface may be generated by the interaction server 1058 and transmitted to the web browser of the operator. The operator may then interact with the user interface through the web-browser. In an embodiment, the user interface of the user interaction data analysis system may be accessible through a dedicated software application. In an embodiment, the user interface of the user interaction data analysis system may be accessible through a mobile computing device, such as a smartphone and/or tablet. In this embodiment, the interaction server 1058 may generate and transmit a user interface to the mobile computing device. Alternatively, the mobile computing device may include modules for generating the user interface, and the interaction server 1058 may provide user interaction data to the mobile computing device. In an embodiment, the interaction server 1058 comprises a mobile computing device.

According to various embodiments, the user interaction data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10B:
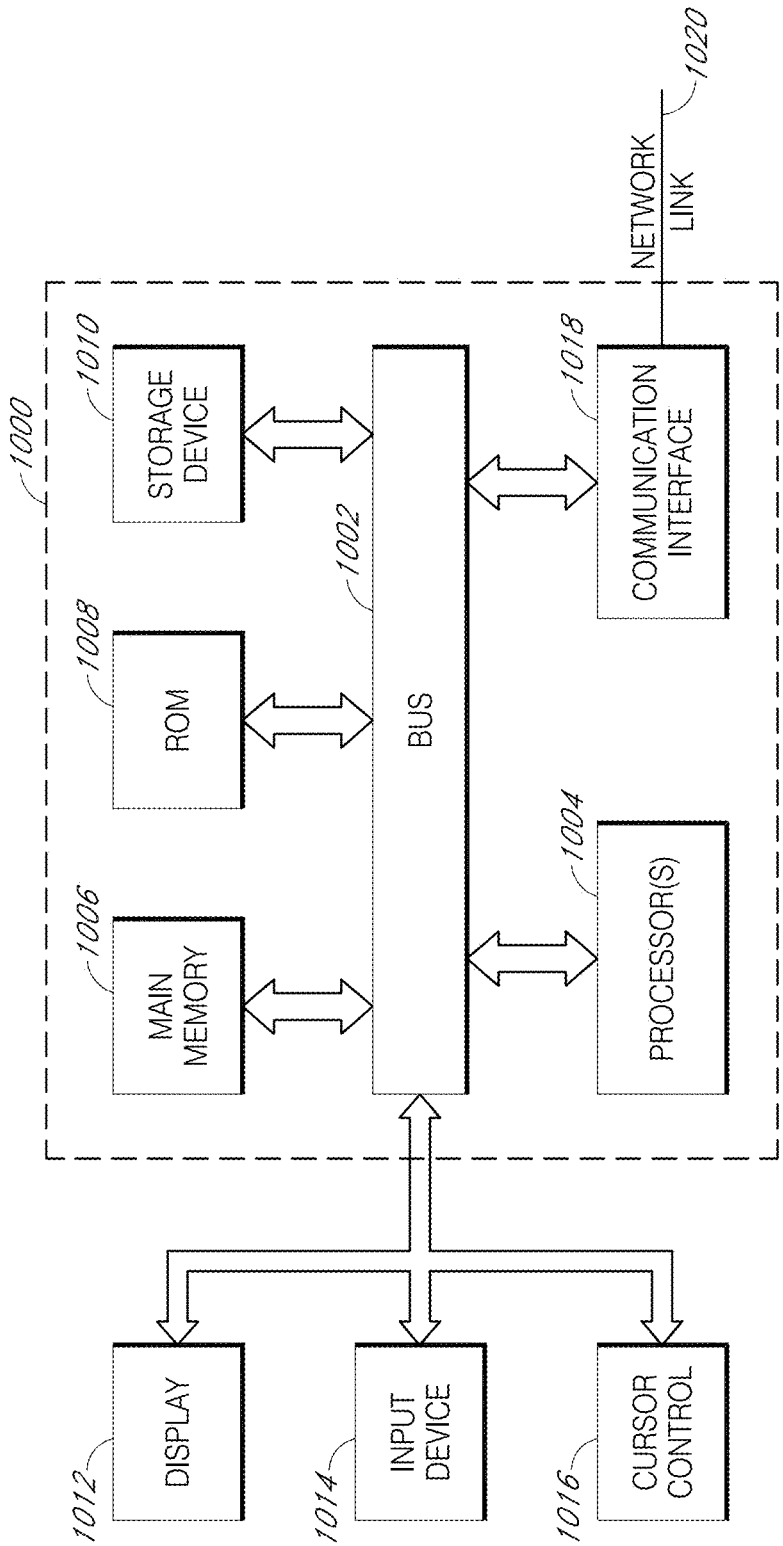

For example, FIG. 10B is a block diagram that illustrates a computer system 1000 upon which the various systems, devices, and/or methods discussed herein may be implemented. For example, some or all aspects of computing system 1000 may be included in any of computing device(s) 1052, mobile computing device(s) 1054, and/or interaction server 1058. In an embodiment, each of the computing device(s) 1052, mobile computing device(s) 1054, and interaction server 1058 is comprised of a computing system similar to the computer system 1000 of FIG. 10B. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT), LCD display, or touch screen display, for displaying information to a computer user and/or receiving input from the user or operator. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include modules to a user interface and the various other aspects of the user interaction data analysis system. These modules may include, for example, the software application 1062, the user interaction module 1064, and/or the other software module(s) 1070 described above, among others. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more modules and/or instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions and/or modules into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that may be connected to any other interface and/or network, for example network 1056 of FIG. 10A. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through one or more local or non-local networks to host computers or other data equipment operated by an Internet Service Provider (ISP).

In an embodiment, the network link 1020 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 1020 and through communication interface 1018, which carry the digital data to and from computer system 1000, are example forms of transmission media.

Computer system 1000 may send messages and/or receive data, including program code, through the network(s), network link 1020 and communication interface 1018. In the Internet example, a server or other computer-enabled device or system may transmit a requested code for an application program through one or more networks and/or communication interface 1018.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
    one or more computer readable storage devices configured to store:
        one or more software modules including computer executable instructions; and
        at least one set of user interaction data collected from interactions of a plurality of users with a software application, the at least one set of user interaction data including indications of interactions of the users with features of the software application, the users being associated with a plurality of groups of users; and
    one or more hardware computer processors in communication with the one or more computer readable storage devices and configured to execute the one or more software modules to cause the computer system to:
        receive an indication of two or more groups of users, wherein the indication of the two or more groups is based on at least one of:
            an input from an operator,
            one or more operator preferences, or
            a previous selection received from the operator;
        access user interaction data associated with users of the two or more groups of users; and
        generate, based on the accessed user interaction data associated with the users of the two or more groups of users, an interactive user interface configured for display on an electronic display, wherein the interactive user interface includes at least:
            a first portion simultaneously including, for each group of the two or more groups of users, respective graphs indicating, over a same period of time, numbers of interactions of users of the groups with one or more features based on the accessed user interaction data related to interactions of users of the groups with the software application.

2. The computer system of claim 1, wherein the interactive user interface further includes at least:
    a second portion including a list of groups of users including at least indications of the two or more groups; and
    a third portion including indications of the two or more features of the software application.

3. The computer system of claim 2, wherein the interactive user interface further includes:
    in the second portion, controls configured to enable the operator to select one or more of the groups of the list of groups, wherein selecting a group of the list causes an indication associated with the group to be displayed; and
    in the third portion, a list of the one or more features, wherein each of the one or more features is individually selectable by the operator.

4. The computer system of claim 1, wherein the period of time is provided by the operator.

5. The computer system of claim 4, wherein the graphs comprise at least one of line graphs or bar graphs.

6. The computer system of claim 5, wherein the graphs comprise bar graphs, and wherein bar graphs indicate, for the users of the groups and each of the one or more features, distributions indicating frequencies of user interactions.

7. The computer system of claim 1, wherein the graphs are based on user interaction data collected during an operator-defined period of time.

8. The computer system of claim 1, wherein the user interaction data comprises at least one of usage data, performance data, or crash data.

9. The computer system of claim 8, wherein the usage data indicates user actions including at least one of: selections of interface elements, application components used and/or activated, types of information and/or data accessed, or sources of information and/or data accessed.

10. The computer system of claim 8, wherein the performance data indicates timings for completion of tasks by the software application.

11. The computer system of claim 1, wherein the interactive user interface further includes one or more controls configured to enable the operator to create groups of the plurality of users, and wherein at least one of the two or more groups of the plurality of users is automatically determined.

12. The computer system of claim 1, wherein the at least one set of user interaction data is collected as users interact with the software application,
wherein the software application includes one or more hooks,
wherein in response to at least one of an action by a user or a crash of the software application, the one or more hooks generate a record of the action by the user or the crash including at least one of: an identifier of the user, a time, an item selected, an application component used and/or activated, or an identification of data accessed.

13. A computer system comprising:
one or more computer readable storage devices configured to store:
one or more software modules including computer executable instructions; and
at least one set of user interaction data collected from interactions of a plurality of users with a software application, the at least one set of user interaction data including indications of interactions of the users with features of the software application, the users being associated with a plurality of groups of users; and
one or more hardware computer processors in communication with the one or more computer readable storage devices and configured to execute the one or more software modules to cause the computer system to:
receive an indication of two or more features, wherein the indication of the two or more features is based on at least one of:
an input from an operator user,
one or more operator preferences, or
a previous selection received from the operator;
access user interaction data related to interactions of users with the two or more features; and
generate, based on the accessed user interaction data related to interactions of users with the two or more features, an interactive user interface configured for display on an electronic display, wherein the interactive user interface includes at least:
a first portion simultaneously including, for each feature of the two or more features, respective graphs indicating, over a same period of time, numbers of interactions of users of one or more groups of users with the features based on the accessed user interaction data related to interactions of users with the features of the software application.

14. The computer system of claim 13, wherein the interactive user interface further includes at least:
a second portion including a list of features including at least indications of the two or more features; and
a third portion including indications of the two or more features of the software application.

15. The computer system of claim 14, wherein the interactive user interface further includes:
in the second portion, controls configured to enable the operator to select one or more of the features of the list of features, wherein selecting a feature of the list causes an indication associated with the feature to be displayed; and
in the third portion, a list of the one or more groups, wherein each of the one or more groups is individually selectable by the operator.

16. The computer system of claim 13, wherein the period of time is provided by the operator.

17. The computer system of claim 16, wherein the graphs comprise at least one of line graphs or bar graphs.

18. The computer system of claim 17, wherein the graphs comprise bar graphs, and wherein bar graphs indicate, for the features and each of the one or more groups, distributions indicating frequencies of user interactions.

* * * * *